United States Patent
Kitao et al.

(10) Patent No.: US 11,894,726 B2
(45) Date of Patent: Feb. 6, 2024

(54) ROTATING ELECTRIC MACHINE

(71) Applicant: Mitsubishi Electric Corporation, Tokyo (JP)

(72) Inventors: Junji Kitao, Tokyo (JP); Kosho Yamane, Tokyo (JP); Tomohira Takahashi, Tokyo (JP); Yoshihiro Miyama, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 461 days.

(21) Appl. No.: 17/414,950

(22) PCT Filed: Mar. 22, 2019

(86) PCT No.: PCT/JP2019/012168
§ 371 (c)(1),
(2) Date: Jun. 17, 2021

(87) PCT Pub. No.: WO2020/194390
PCT Pub. Date: Oct. 1, 2020

(65) Prior Publication Data
US 2022/0060070 A1 Feb. 24, 2022

(51) Int. Cl.
*H02K 1/27* (2022.01)
*H02K 21/16* (2006.01)
(Continued)

(52) U.S. Cl.
CPC ........... *H02K 1/2766* (2013.01); *H02K 21/16* (2013.01); *H02K 29/03* (2013.01); *H02K 2213/03* (2013.01)

(58) Field of Classification Search
CPC ...... H02K 1/2766; H02K 21/16; H02K 29/03; H02K 2213/03
(Continued)

(56) References Cited

U.S. PATENT DOCUMENTS 7,768,172 B2 * 8/2010 Takahata ............... H02K 1/276
310/156.56
7,915,776 B2 * 3/2011 Takahata ............... H02K 1/276
310/156.56
(Continued)

FOREIGN PATENT DOCUMENTS

JP 9-23598 A 1/1997
JP 11-178255 A 7/1999
(Continued)

OTHER PUBLICATIONS

International Search Report and Written Opinion dated Jun. 11, 2019, received for PCT Application PCT/JP2019/012168, Filed on Mar. 22, 2019, 8 pages including English Translation.
(Continued)

*Primary Examiner* — Alex W Mok
(74) *Attorney, Agent, or Firm* — XSENSUS LLP

(57) ABSTRACT

In a rotating electric machine, a rotor core includes; a gap surface; a plurality of magnet insertion holes; a slit which is formed in a core region between the gap surface and, among the plurality of magnet insertion holes, a magnet insertion hole into which a permanent magnet forming one magnetic pole is inserted, and divides the core region into a plurality of divided core regions in the circumferential direction; and a cutout formed by denting the gap surface of a divided core region, wherein a shortest distance between a stator core imaginary gap surface which is in contact with distal end surfaces of the plurality of teeth, and a bottom point of the cutout is longer than a shortest distance between the stator core imaginary gap surface and each of two intersections between the cutout and the gap surface.

17 Claims, 18 Drawing Sheets

(51) Int. Cl.
*H02K 1/276* (2022.01)
*H02K 29/03* (2006.01)

(58) Field of Classification Search
USPC .................................................. 310/156.56
See application file for complete search history.

(56) References Cited

U.S. PATENT DOCUMENTS

| | | | | | |
|---|---|---|---|---|---|
| 7,960,886 | B2* | 6/2011 | Miura | ................... | H02K 1/2766 |
| | | | | | 310/156.57 |
| 8,247,940 | B2* | 8/2012 | Hino | ................... | B60L 15/007 |
| | | | | | 310/156.47 |
| 8,264,113 | B2* | 9/2012 | Takemoto | .............. | H02K 1/276 |
| | | | | | 310/156.53 |
| 8,659,200 | B2* | 2/2014 | Adaniya | ................. | H02K 21/16 |
| | | | | | 310/156.57 |
| 8,714,948 | B2* | 5/2014 | Baba | ...................... | H02K 21/16 |
| | | | | | 310/216.106 |
| 8,957,561 | B2* | 2/2015 | Sano | ..................... | H02K 1/2766 |
| | | | | | 310/156.56 |
| 9,647,501 | B2* | 5/2017 | Nigo | ..................... | H02K 1/2773 |
| 9,806,571 | B2* | 10/2017 | Fujisawa | ................ | H02K 1/2773 |
| 2008/0018190 | A1* | 1/2008 | Takahata | ................ | H02K 1/276 |
| | | | | | 310/156.55 |
| 2009/0261679 | A1* | 10/2009 | Sakai | ..................... | H02K 29/03 |
| | | | | | 310/156.53 |
| 2010/0181864 | A1* | 7/2010 | Miura | ................... | H02K 1/2766 |
| | | | | | 310/216.094 |
| 2013/0093284 | A1* | 4/2013 | Utaka | .................. | H02K 1/2766 |
| | | | | | 310/216.094 |
| 2017/0093237 | A1* | 3/2017 | Tsuda | ..................... | H02K 29/03 |

FOREIGN PATENT DOCUMENTS

| | | |
|---|---|---|
| JP | 11-206046 A | 7/1999 |
| JP | 2012-23904 A | 2/2012 |
| JP | 2013-230080 A | 11/2013 |

OTHER PUBLICATIONS

Notice of Reasons for Refusal dated Nov. 19, 2019, received for JP Application 2019-548493, 6 pages including English Translation.

* cited by examiner

ROTATING ELECTRIC MACHINE

CROSS-REFERENCE TO RELATED APPLICATION

The present application is based on PCT filing PCT/JP2019/012168, filed Mar. 22, 2019, the entire contents of which are incorporated herein by reference.

TECHNICAL FIELD

The present invention relates to a rotating electric machine, and more particularly, to a rotating electric machine including a rotor including permanent magnets.

BACKGROUND ART

A permanent magnet rotating electric machine, which is advantageous in downsizing and increase in output, is adopted in many cases as a rotating electric machine for industrial use and rotating electric machines for an electric vehicle and for a hybrid vehicle. Among the permanent magnet rotating electric machines described above, when the permanent magnet rotating electric machine has such a structure that permanent magnets are embedded in a rotor core, two types of torque can be obtained. Specifically, a magnet torque is generated by a magnet magnetic flux from the permanent magnet, and a reluctance torque is generated by a reluctance magnetic flux caused by a magnetic resistance of the rotor core. A final torque of the rotating electric machine is a combined torque of those two types of torque.

However, the permanent magnet rotating electric machine configured as described above has a feature in that the above-mentioned two types of torque have peak values at different current phase angles. Therefore, a current phase angle at which the combined torque of the two types of torque has a peak value is shifted from the current phase angle at which each of the two types of torque has the peak value. As a result, the peak value of the combined torque of the two types of torque becomes smaller than a sum of the peak values of the two types of torque.

In view of such a situation, there has been proposed a structure in which a slit is formed in a rotor core to cause a magnetic flux flowing from a permanent magnet toward a stator to deviate in a rotating direction of a rotor (for example, Patent Literature 1).

In Patent Literature 1, the slit causes the magnetic flux flowing from the permanent magnet toward the stator to deviate in the rotating direction of the rotor so that the current phase angle at which the magnet torque has the peak value is changed. In this manner, a difference between the current phase angle at which the magnet torque has the peak value and the current phase angle at which the reluctance torque has the peak value is decreased, and thus the peak value of the combined torque of those torques is increased.

CITATION LIST

Patent Literature

[PTL 1] JP 11-206046 A

SUMMARY OF INVENTION

Technical Problem

In Patent Literature 1, the slit for causing the magnetic flux flowing from the permanent magnet toward the stator to deviate in the rotating direction of the rotor is formed in a core region of the rotor core on a radially outer side of the permanent magnet. However, when the silt is formed, there have been problems in that the torque is reduced in a rotating direction opposite to the above-mentioned direction, and further the torque ripple is increased.

The present invention has been made to solve the above-mentioned problems, and has an object to provide a rotating electric machine with which, while a peak value of a combined torque of a magnet torque and a reluctance torque in a direction of a circumferential force acting on a rotor when a stator coil is energized is increased, the torque ripple in an opposite direction can be reduced.

Solution to Problem

According to the present invention, there is provided a rotating electric machine including: a stator including: a stator core in which a plurality of teeth radially projecting from an annular core back are arrayed in a circumferential direction; and a stator coil; and a rotor including: a rotor core arranged coaxially with the stator core with a gap being secured between the stator core and the rotor core; and a plurality of permanent magnets which are embedded in the rotor core, and are arranged in the circumferential direction. The rotor core has: a gap surface facing the gap; a plurality of magnet insertion holes into which the plurality of permanent magnets are inserted; a slit which is formed in a core region between the gap surface and, among the plurality of magnet insertion holes, a magnet insertion hole into which a permanent magnet forming one magnetic pole is inserted, and divides the core region into a plurality of divided core regions in the circumferential direction; and a cutout formed by denting the gap surface of, among the plurality of divided core regions, a divided core region positioned at a head in a direction opposite to a direction of a circumferential force acting on the rotor when the stator coil is energized, wherein, in a plane orthogonal to an axial direction of the rotor core, a shortest distance between a stator core imaginary gap surface which is a perfect circle having an axial center of the rotor core as a center, and is in contact with distal end surfaces of the plurality of teeth facing the gap, and a bottom point of the cutout is longer than a shortest distance between the stator core imaginary gap surface and each of two intersections between the cutout and the gap surface.

Advantageous Effects of Invention

According to the present invention, with the above-mentioned configuration, it is possible to achieve a rotating electric machine with which, while a peak value of a combined torque of a magnet torque and a reluctance torque in a direction of a circumferential force acting on a rotor when a stator coil is energized is increased, the torque ripple in an opposite direction can be reduced.

DESCRIPTION OF EMBODIMENTS

First Embodiment

Figure 1:
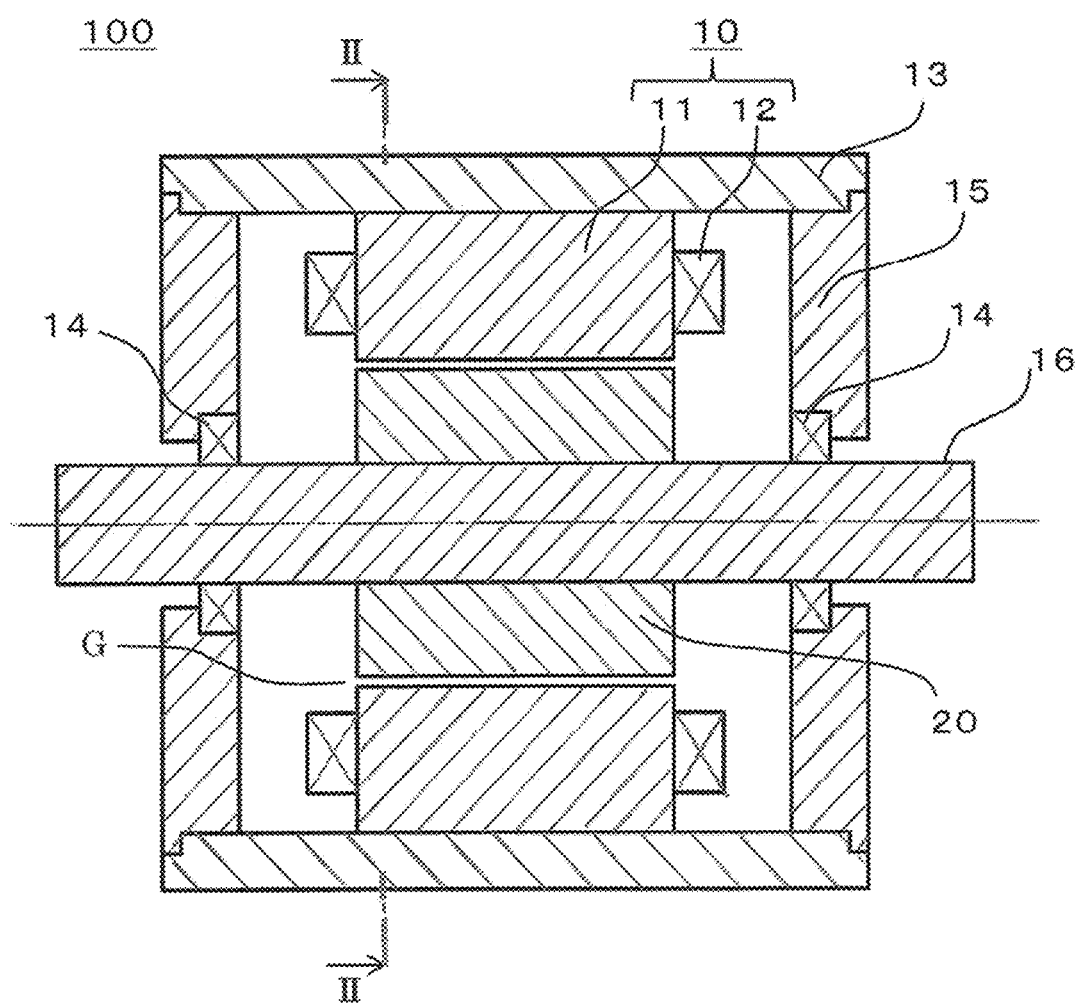
FIG. 1 is a longitudinal sectional view for illustrating a rotating electric machine according to a first embodiment of the present invention.
Figure 2:
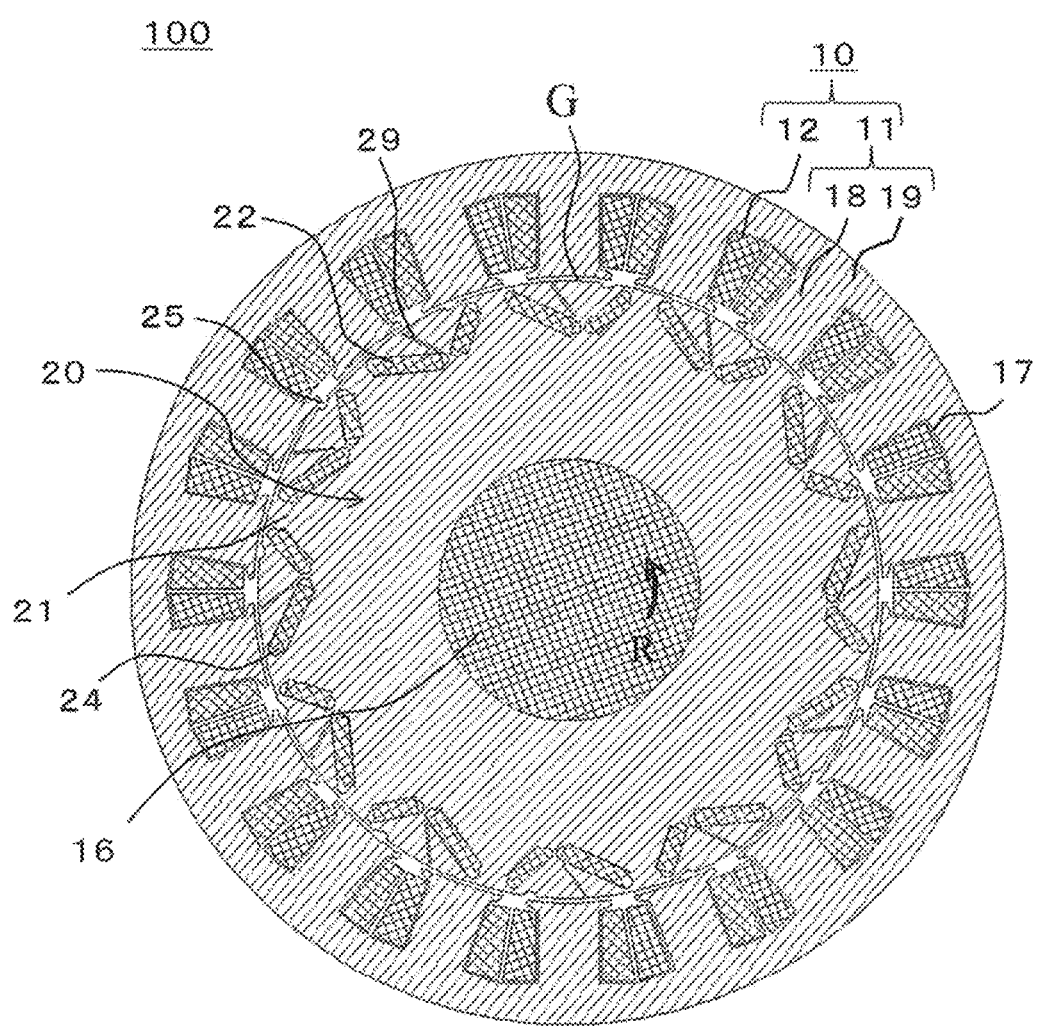
FIG. 2 is a sectional view taken along the arrow line II-II of FIG. 1.

FIG. 1 is a longitudinal sectional view for illustrating a rotating electric machine according to a first embodiment of the present invention. FIG. 2 is a sectional view taken along the arrow line II-II of FIG. 1. A longitudinal sectional view refers to a sectional view for illustrating a cross-section including an axial center of a rotary shaft. In FIG. 2, a frame is omitted. Further, in this specification, for the sake of convenience, a direction parallel to the axial center of the rotary shaft is referred to as an "axial direction", a direction orthogonal to the axial center of the rotary shaft about the axial center of the rotary shaft as a center is referred to as a "radial direction", and a direction of rotation about the rotary shaft as a center is referred to as a "circumferential direction". In the drawings, R denotes a rotating direction of the rotary shaft. Further, a direction opposite to the rotating direction R is referred to as a "counter-rotating direction".

In FIG. 1 and FIG. 2, a rotating electric machine 100 includes a cylindrical frame 13, a pair of end plates 15, and a rotary shaft 16. The pair of end plates 15 is mounted to both ends of the frame 13 in the axial direction, and is configured to close openings on both sides of the frame 13 in the axial direction. The rotary shaft 16 is supported by bearings 14 mounted to the pair of end plates 15 so as to be rotatable in the frame 13. The rotating electric machine 100 further includes a rotor 20 and a stator 10. The rotor 20 is firmly fixed to the rotary shaft 16 and provided so as to be rotatable in the frame 13. The stator 10 is inserted into and held by the frame 13, and is provided coaxially with the rotor 20 on the radially outer side of the rotor 20. A gap G is formed between the rotor 20 and the stator 10.

The stator 10 includes an annular stator core 11, and a stator coil 12 mounted to the stator core 11. The stator core 11 includes an annular core back 19, and a plurality of teeth 18 projecting from an inner peripheral surface of the core back 19 inward in the radial direction and arrayed in the circumferential direction. The stator core 11 is formed by, for example, stacking and integrating thin electromagnetic steel plates in the axial direction. Eighteen teeth 18 are arrayed at equiangular pitches in the circumferential direction, and a region between adjacent teeth 18 serves as a slot 17. Distal end surfaces of the eighteen teeth 18 facing the gap G are formed as arc surfaces in contact with a cylindrical surface having the axial center of the stator 10 as a center axis. The stator coil 12 is formed of concentrated-winding coils each formed by winding a conductive wire around corresponding one of the teeth 18. Adjacent concentrated-winding coils are accommodated in each of the slots 17.

The rotor 20 includes the rotary shaft 16, a cylindrical rotor core 21, and twenty-four permanent magnets 22. The rotor core 21 has a shaft insertion hole formed at an axial center position thereof. The permanent magnets 22 are embedded on the radially outer side of the rotor core 21. The rotor core 21 is firmly fixed to the rotary shaft 16 inserted through the shaft insertion hole. Both ends of the rotary shaft 16 in the axial direction are supported by the bearings 14 so that the rotor 20 is provided to be rotatable in the frame 13. The rotor core 21 is formed by, for example, stacking and integrating thin electromagnetic steel plates in the axial direction.

Figure 3:
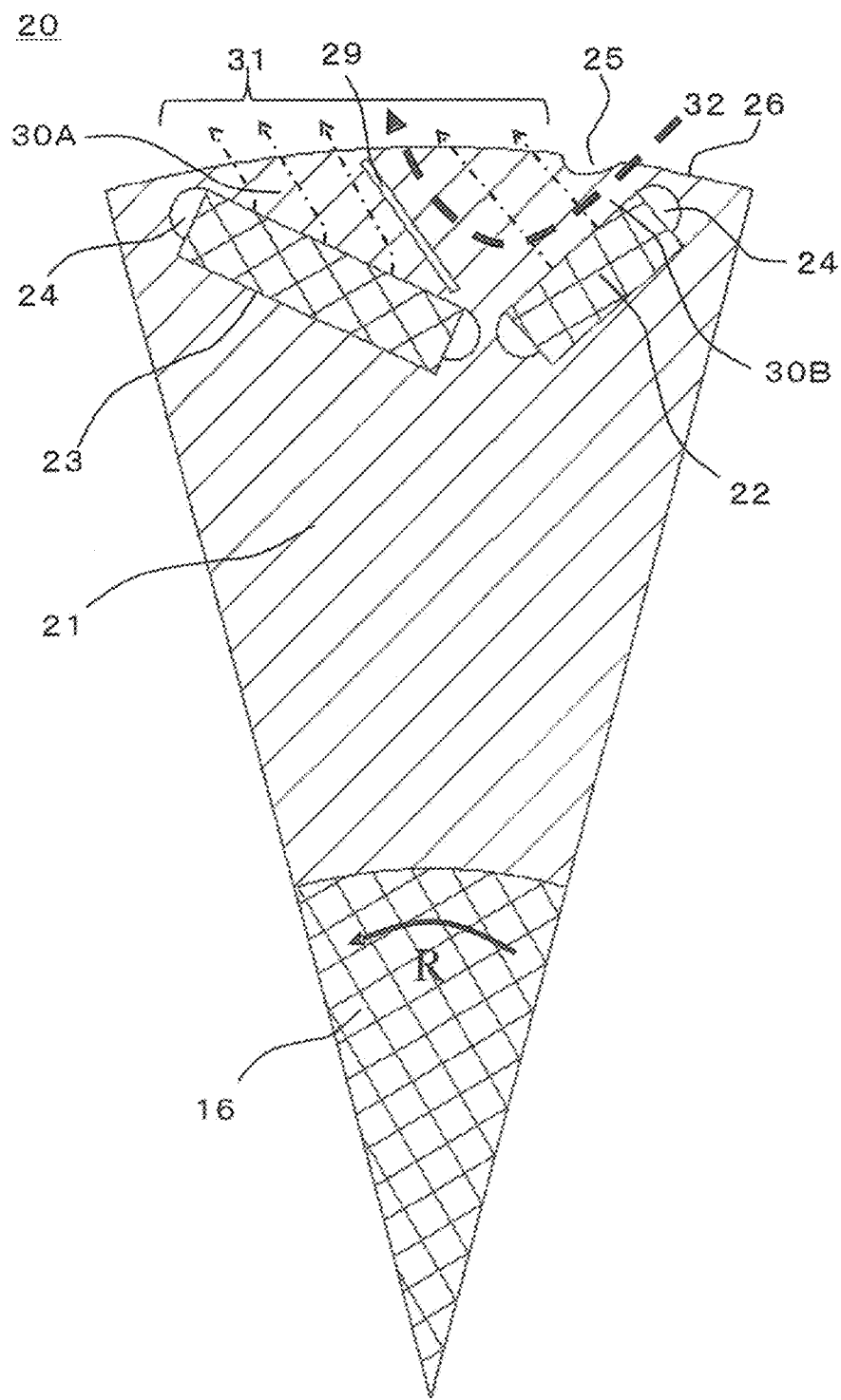
FIG. 3 is a main-part transverse sectional view for illustrating a part around one magnetic pole of a rotor in the rotating electric machine according to the first embodiment of the present invention.

Now, the structure around a magnetic pole of the rotor 20 is described with reference to FIG. 3. FIG. 3 is a main-part transverse sectional view for illustrating a part around one magnetic pole of the rotor in the rotating electric machine according to the first embodiment of the present invention. A transverse sectional view refers to a sectional view for illustrating a cross-section orthogonal to the axial center of the rotary shaft.

On the radially outer side of the rotor core 21, twelve pairs of magnet insertion holes 23 are formed at equiangular pitches in the circumferential direction. The magnet insertion holes 23 pass through the rotor core 21 in the axial direction. Each pair of magnet insertion holes 23 is formed in a V-shape so that an interval in the circumferential direction is gradually increased toward the radially outer side. The magnet insertion holes 23 are each formed into a hole shape having a rectangular cross-section. End portions on the radially inner side of the magnet insertion holes 23 forming a pair are separated away from each other in the circumferential direction.

The permanent magnets 22 are each formed as a prismatic body having a rectangular cross-section equivalent to that of the magnet insertion hole 23. The permanent magnets 22 are each magnetized so as to have magnetization orthogonal to a surface defined by a long side of the rectangular cross-section. In this manner, a first surface of the permanent magnet 22 defined by the long side of the rectangular cross-section thereof has an N pole, and a second surface thereof on the opposite side of the first surface has an S pole. The permanent magnets 22 are inserted and held in each pair of magnet insertion holes 23 so that surfaces having the same polarity are directed to the radially outer side, and are inserted and held in adjacent pairs of magnet insertion holes 23 so that surfaces having different polarities are directed to the radially outer side. That is, each pair of permanent magnets 22 arranged in a V-shape forms one magnetic pole. Then, twelve pairs of permanent magnets 22 each forming one magnetic pole are embedded on the radially outer side of the rotor core 21 to be arrayed at equiangular pitches in the circumferential direction. In this manner, the rotor 20 has twelve magnetic poles.

A flux barrier 24 is formed by projecting a surface on the radially outer side of each magnet insertion hole 23, which is defined by a short side of the rectangular cross-section thereof, in a length direction of the long side of the rectangular cross-section of the magnet insertion hole 23. Similarly, a flux barrier 24 is formed by projecting a surface on the radially inner side of each magnet insertion hole 23, which is defined by a short side of the rectangular cross-section thereof, in the length direction of the long side of the rectangular cross-section of the magnet insertion hole 23. Each of the flux barriers 24 is formed so as to pass through the rotor core 21 in the axial direction. The flux barrier 24 is a part of the magnet insertion hole 23.

A slit 29 is formed in a core region of the rotor core 21 positioned on the gap G side, that is, on the radially outer side of the pair of permanent magnets 22 arranged in the V-shape forming one magnetic pole. The slit 29 tilts forward in the rotating direction R. The slit 29 linearly extends so as to reach the vicinity of a gap surface 26 of the rotor core 21. The slit 29 may be formed so as to pass through the rotor core 21 in the axial direction, or may be formed so as not to pass through the rotor core 21 in the axial direction.

The slit 29 is filled with air. Air has a magnetic permeability lower than that of the rotor core 21. Thus, the slit 29 is a low magnetic permeability region in the core region on the radially outer side of the pair of permanent magnets 22 arranged in the V-shape. The slit 29 may be filled with, for example, a resin or a heat dissipating material having a magnetic permeability lower than that of the rotor core 21. In this manner, the strength of the rotor core 21 can be increased. Further, an effect of cooling the rotor core 21 and the permanent magnets 22 can be increased.

A cutout 25 is formed in a core region on a rear side in the rotating direction R with respect to the slit 29, in the core region on the radially outer side of the pair of permanent magnets 22 arranged in the V-shape. The cutout 25 is formed by denting the gap surface 26 corresponding to an outer peripheral surface of the rotor core 21 so as to reach from one end to the other end in the axial direction. Accordingly, the cutout 25 is filled with air. Air has a magnetic permeability lower than that of the rotor core 21. Thus, the cutout 25 is a low magnetic permeability region in the core region on the radially outer side of the pair of permanent magnets 22 arranged in the V-shape.

In the rotating electric machine 100 configured as described above, the number of slots 17 of the stator 10 is eighteen, and the number of poles of the rotor 20 is twelve. That is, the rotating electric machine 100 is an inner rotor-type rotating electric machine employing a system in which a ratio of the number of poles to the number of slots is 2:3. The rotating electric machine 100 is assumed to be used for a power running operation. The power running operation refers to an operation for converting electric energy for energizing the stator coil 12 into kinetic energy for rotating the rotor 20. At this time, the rotating electric machine 100 operates as an electric motor. When the stator coil 12 is energized, a circumferential force acts on the rotor 20 in the same direction as the rotating direction R of the rotor 20. The power running operation is not a main idea of the present invention, and thus detailed description thereof is herein omitted.

The slit 29 tilts to a front side in the rotating direction R, that is, to a forward side in the rotating direction R. In this manner, the core region on the radially outer side of the pair of permanent magnets 22 forming one magnetic pole and being arranged in the V-shape is divided by the slit 29 in the circumferential direction into a divided core region 30A on the forward side in the rotating direction R and a divided core region 30B on the backward side in the rotating direction R. The cutout 25 is formed in the gap surface 26 of the divided core region 30B positioned at a head in the direction opposite to the rotating direction R, in the core region on the radially outer side of the pair of permanent magnets 22 forming one magnetic pole. The core region on the radially outer side of the pair of permanent magnets 22 forming one magnetic pole is a core region between the gap surface 26 and the magnet insertion holes 23 into which the permanent magnets 22 forming one magnetic pole are inserted.

Next, a state of the magnetic fluxes being sources of generation of the torque is described.

A magnet magnetic flux 31 generated from a magnetic flux generation surface of the permanent magnet 22 positioned on the forward side in the rotating direction R flows from the rotor core 21 to the gap G. At this time, a direction in which the magnet magnetic flux 31 flows is restricted by the slit 29 being the low magnetic permeability region, and the magnet magnetic flux 31 is caused to deviate to the forward side in the rotating direction R. In this manner, the magnet magnetic flux 31 is localized in the divided core region 30A as indicated by the arrows of FIG. 3. As a result, a current phase angle at which a magnet torque has a positive peak value can be set larger than a current phase angle of a case in which no slit 29 is formed.

A path of a reluctance magnetic flux 32 flowing through the rotor core 21 from the stator core 11 via the gap G is restricted by the slit 29 being the low magnetic permeability region. In this manner, the reluctance magnetic flux 32 flows only through the divided core region 30B without flowing through the divided core region 30A as indicated by the arrow of FIG. 3. As a result, a current phase angle at which a reluctance torque has a positive peak value can be set smaller than the current phase angle obtained in the case in which no slit 29 is formed.

Thus, a distance between the current phase angle at which the magnet torque has the positive peak value and the current phase angle at which the reluctance torque has the positive peak value is reduced. In this case, a combined torque of the magnet torque and the reluctance torque, that is, a comprehensive torque at the time of the power running operation can be improved.

Figure 4:
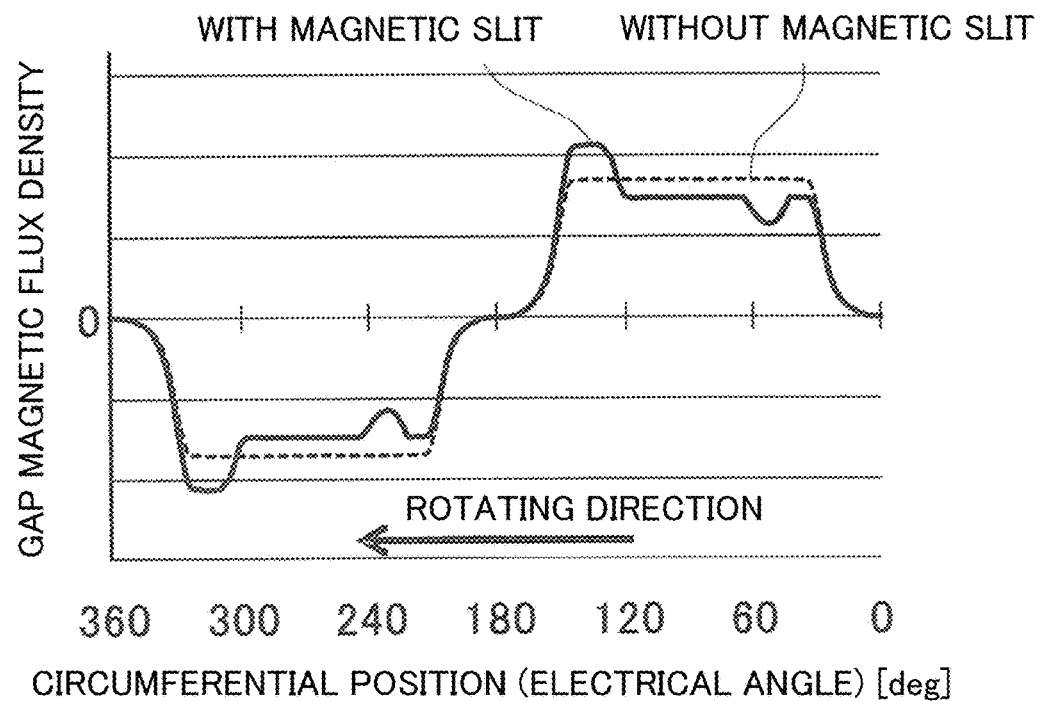
FIG. 4 is a graph for showing a gap magnetic flux density distribution caused by a magnet magnetic flux for one period of electrical angle in a non-energized state of the rotating electric machine according to the first embodiment of the present invention.

Next, results obtained by analyzing, by a finite element method, a gap magnetic flux density distribution caused by the magnet magnetic flux 31 for one period of electrical angle under a non-energized state are shown in FIG. 4. The one period of electrical angle corresponds to two magnetic poles. FIG. 4 is a graph for showing a gap magnetic flux density distribution caused by a magnet magnetic flux for one period of electrical angle in a non-energized state of the rotating electric machine according to the first embodiment of the present invention. In FIG. 4, the horizontal axis represents a circumferential position, and the vertical axis represents the gap magnetic flux density. Further, the dotted line indicates a gap magnetic flux density when no slit 29 is formed, and the solid line indicates a gap magnetic flux density when the slit 29 is formed.

It is understood from FIG. 4 that the gap magnetic flux density in one magnetic pole at the time of the power running operation deviates to the forward side in the rotating direction R of the rotor 20 when the slit 29 is formed as compared to when no slit 29 is formed.

Figure 5:
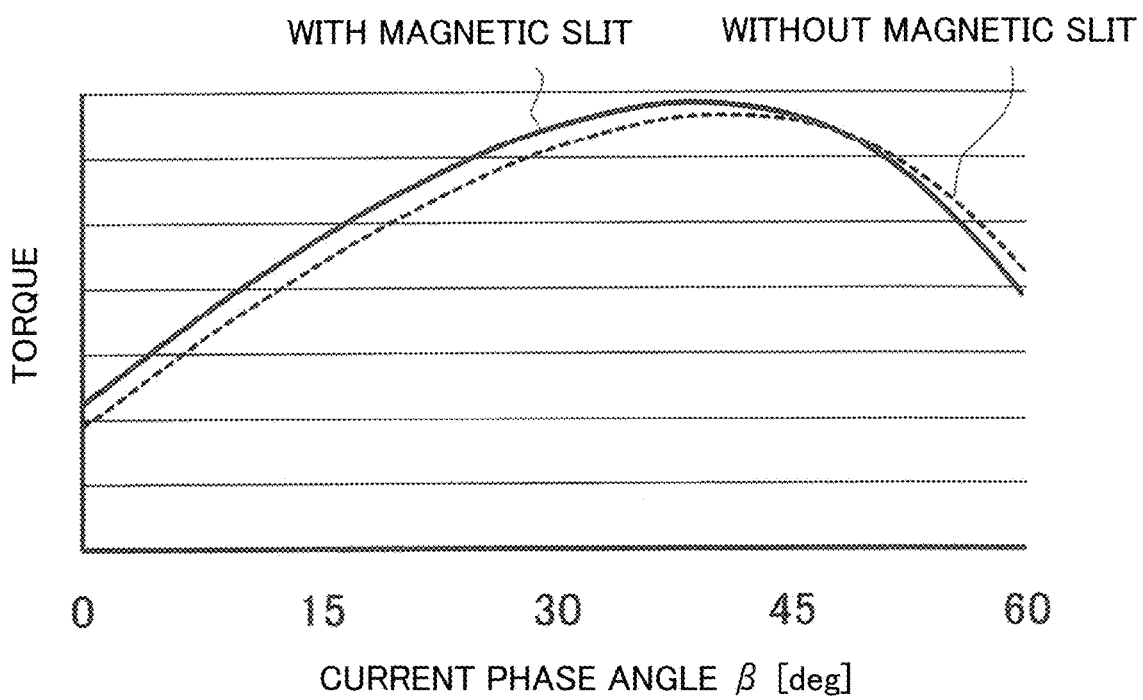
FIG. 5 is a graph for showing a change in torque with respect to a current phase angle under a condition of a constant current value, in the rotating electric machine according to the first embodiment of the present invention.

Next, results obtained by analyzing, by a finite element method, a change in torque with respect to a current phase angle β under a condition of a constant current value are shown in FIG. 5. FIG. 5 is a graph for showing a change in torque with respect to a current phase angle under a condition of a constant current value, in the rotating electric machine according to the first embodiment of the present invention. In FIG. 5, the horizontal axis represents the current phase angle β, and the vertical axis represents torque. Further, the dotted line indicates the torque when no slit 29 is formed, and the solid line indicates the torque when the slit 29 is formed. The torque is the combined torque of the magnet torque and the reluctance torque.

It is understood from FIG. 5 that the current phase angle β at which the combined toque has the positive peak value when the slit 29 is formed is smaller than the current phase angle β at which the combined toque has the positive peak value when no slit 29 is formed. Further, it is understood from FIG. 5 that the positive peak value of the combined torque when the slit 29 is formed is larger than the positive peak value of the combined torque when no slit 29 is formed.

When no slit 29 is formed, the magnet torque has the positive peak value when the current phase angle β is 0°, and the reluctance torque has the positive peak value when the current phase angle β is 45°. From the results of FIG. 5, it is speculated that, when the slit 29 is formed, the current phase angle β at which the magnet torque has the positive peak value and the current phase angle β at which the reluctance torque has the positive peak value are brought close to each other to improve the combined torque.

As described above, in the first embodiment, the slit 29 being the low magnetic permeability region is formed in the core region on the radially outer side of the pair of permanent magnets 22 forming one magnetic pole so as to tilt to the forward side in the rotating direction R. In this manner, the current phase angle β at which the magnet torque has the positive peak value and the current phase angle β at which the reluctance torque has the positive peak value are brought close to each other. As a result, at the time of the power running operation, the combined torque of the magnet torque and the reluctance torque is improved.

Figure 6:
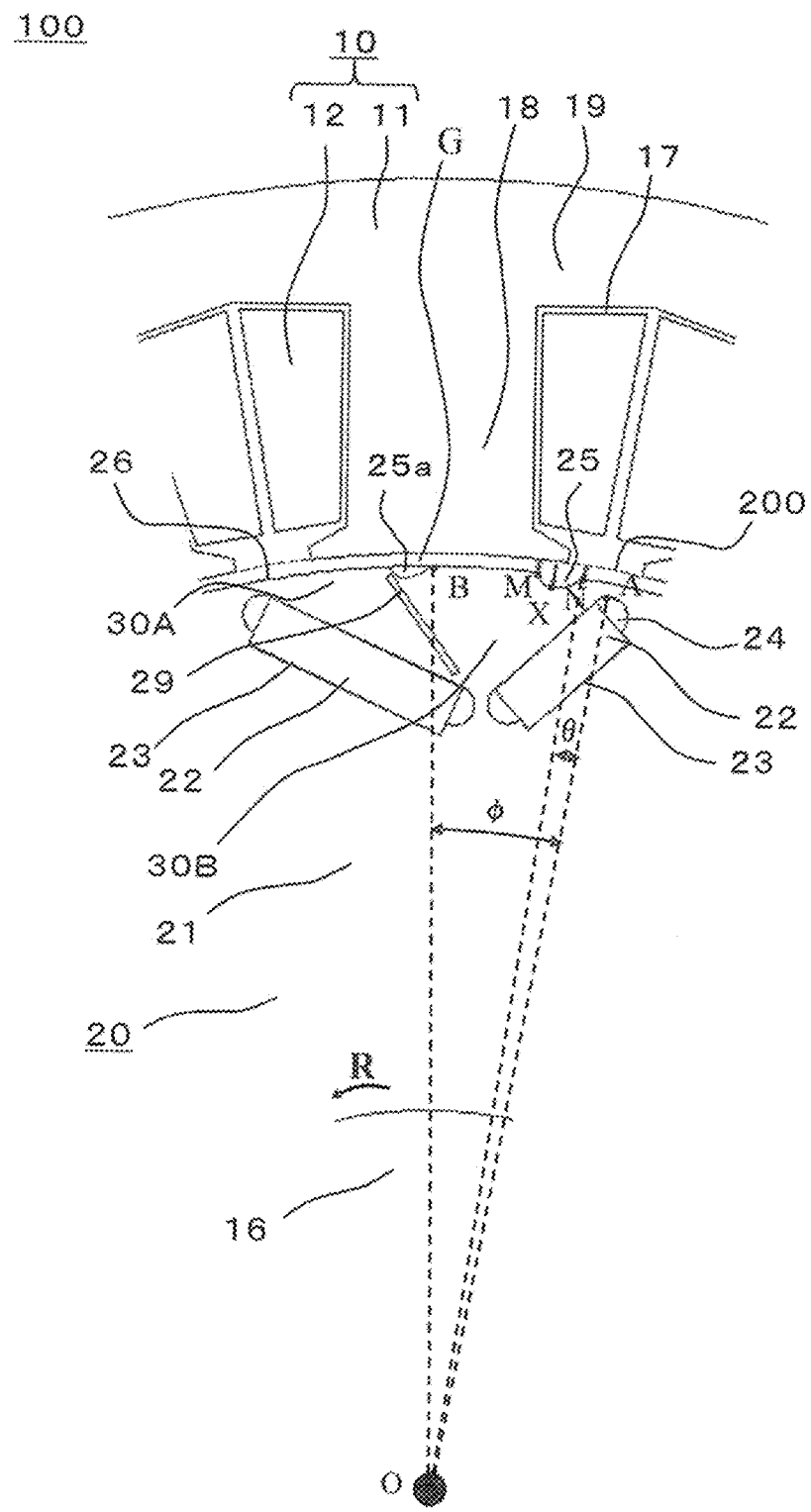
FIG. 6 is a main-part transverse sectional view for illustrating a part around one magnetic pole in the rotating electric machine according to the first embodiment of the present invention.

Now, a specific shape of the cutout 25 is described. FIG. 6 is a main-part transverse sectional view for illustrating a part around one magnetic pole in the rotating electric machine according to the first embodiment of the present invention.

The core region on the radially outer side of the pair of permanent magnets 22 forming one magnetic pole is divided by the slit 29 into two regions of the divided core region 30A on the forward side in the rotating direction R and the divided core region 30B on the backward side in the rotating direction R. The circumferential force acting on the rotor 20 when the stator coil 12 is energized is generated in the divided core region 30A. The cutout 25 is formed in a part of the gap surface 26 of the divided core region 30B positioned at the head in the direction opposite to the direction of the circumferential force acting on the rotor 20 when the stator coil 12 is energized. In a plane orthogonal to the axial center of the rotor core 21, two intersections between the cutout 25 and the gap surface 26 are represented by M and N. The intersection M is an intersection on the side closer to the slit 29. The intersection N is an intersection on the side farther from the slit 29. Further, a perfect circle having, as a center, a rotation center O of the rotor core 21 and having, as a radius, a distance between the rotation center O and a point of the stator core 11 closest to the rotor core 21 is referred to as a "stator core imaginary gap surface 200." In the plane orthogonal to the axial center of the rotor core 21, the stator core imaginary gap surface 200 is a perfect circle having the rotation center O of the rotor core 21 as a center and being in contact with the distal end surfaces of the teeth 18 of the stator core 11. A bottom point of the cutout 25 which is most separated away from the stator core imaginary gap surface 200 is represented by X. At this time, the shortest distance between the bottom point X and the stator core imaginary gap surface 200 is longer than the shortest distance between the intersection M and the stator core imaginary gap surface 200 and the shortest distance between the intersection N and the stator core imaginary gap surface 200.

In this case, a point closest to the gap surface 26 of the magnet insertion hole 23 positioned at the head in the direction opposite to the direction of the circumferential force acting on the rotor 20 when the stator coil 12 is energized, in the magnet insertion holes 23 into which the permanent magnets 22 forming one magnetic pole are inserted, is represented by A. A cutout 25 obtained by imaginarily moving the cutout 25 in the circumferential direction without changing its shape until the cutout 25 is in contact with the slit 29 is referred to as an "imaginary cutout 25a". An intersection closest to the point A of intersections between the imaginary cutout 25a and the gap surface 26 is represented by B. An angle between a straight line OA connecting between the point A and the rotation center O and a straight line ON connecting between the point N and the rotation center O is represented by θ. An angle between the straight line OA and a straight line OB connecting between the point B and the rotation center O is represented by Φ. In the rotating electric machine 100, the cutout 25 is formed in the gap surface 26 of the divided core region 30B so as to satisfy 0<θ/Φ<0.47.

Figure 7:
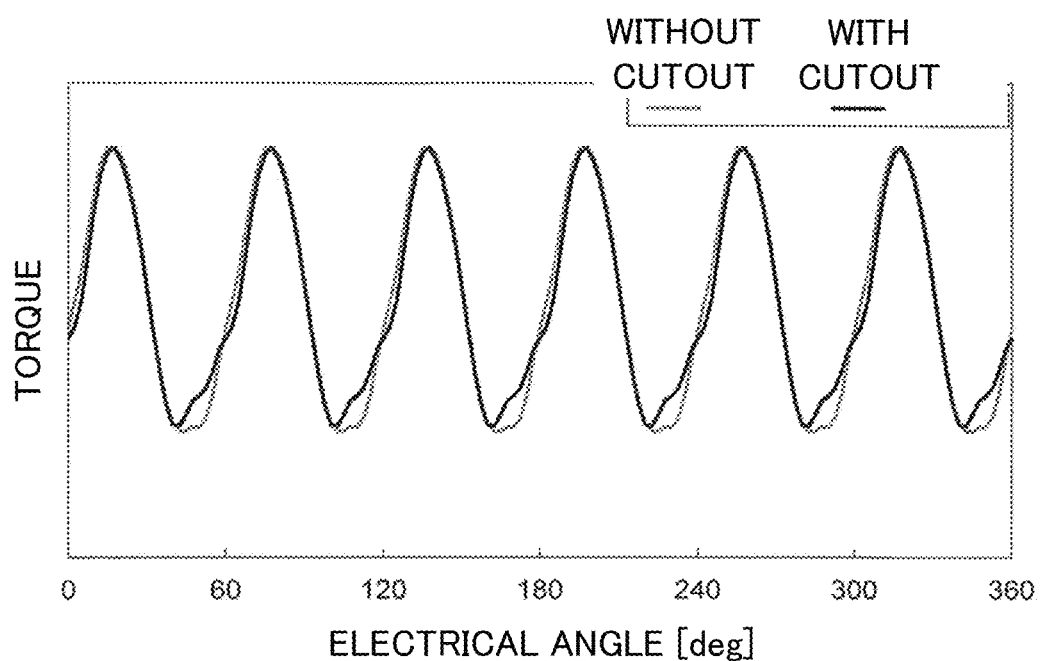
FIG. 7 is a graph for showing a magnetic field analysis result of a power running torque in a rotating direction in the rotating electric machine according to the first embodiment of the present invention.
Figure 8:
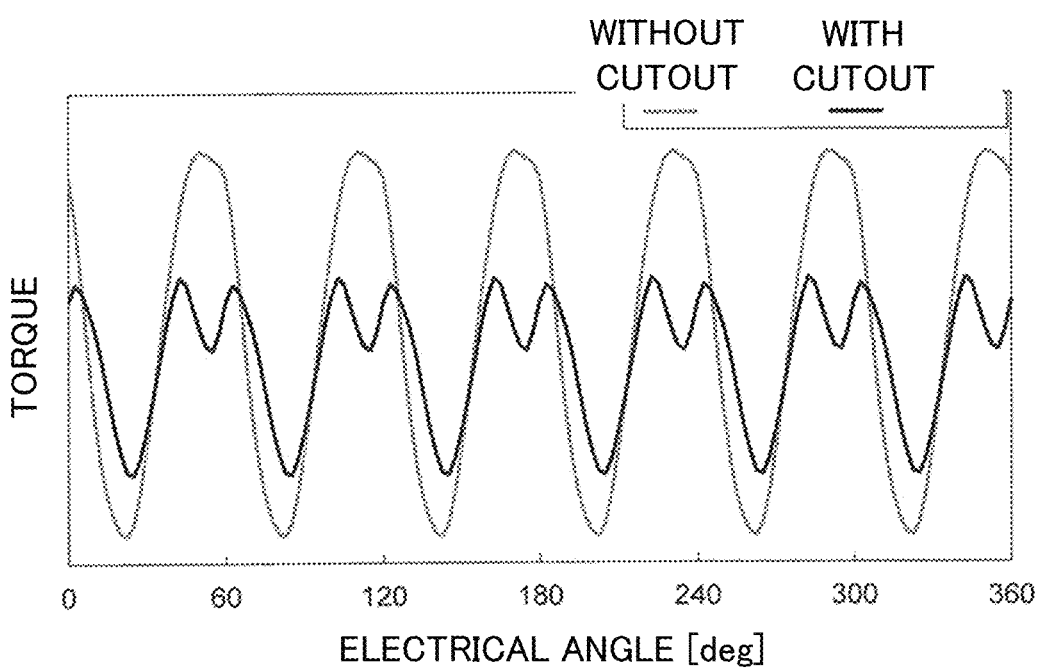
FIG. 8 is a graph for showing a magnetic field analysis result of a power running torque in a counter-rotating direction in the rotating electric machine according to the first embodiment of the present invention.
Figure 9:
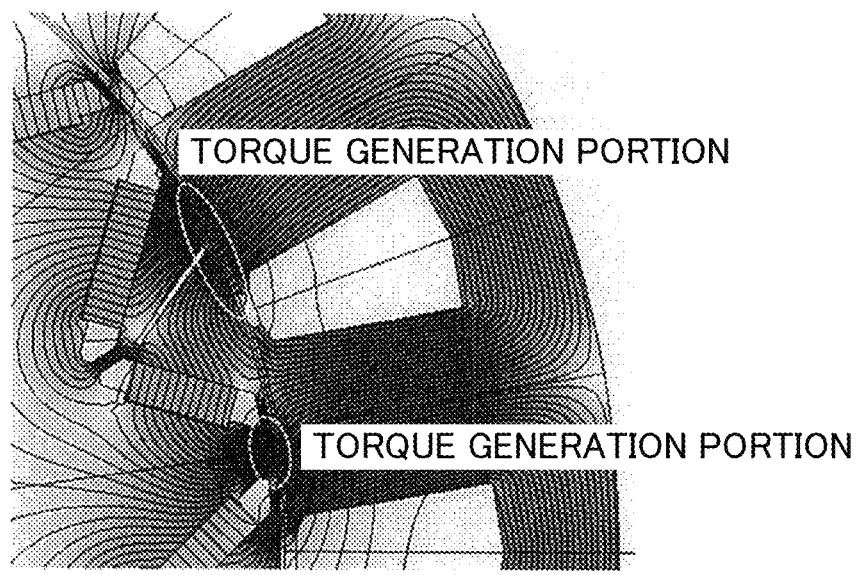
FIG. 9 is a diagram for illustrating magnetic flux density contours and flux lines obtained through magnetic field analysis at the time of the minimum power running torque in the rotating direction of the rotating electric machine having no cutout.
Figure 10:
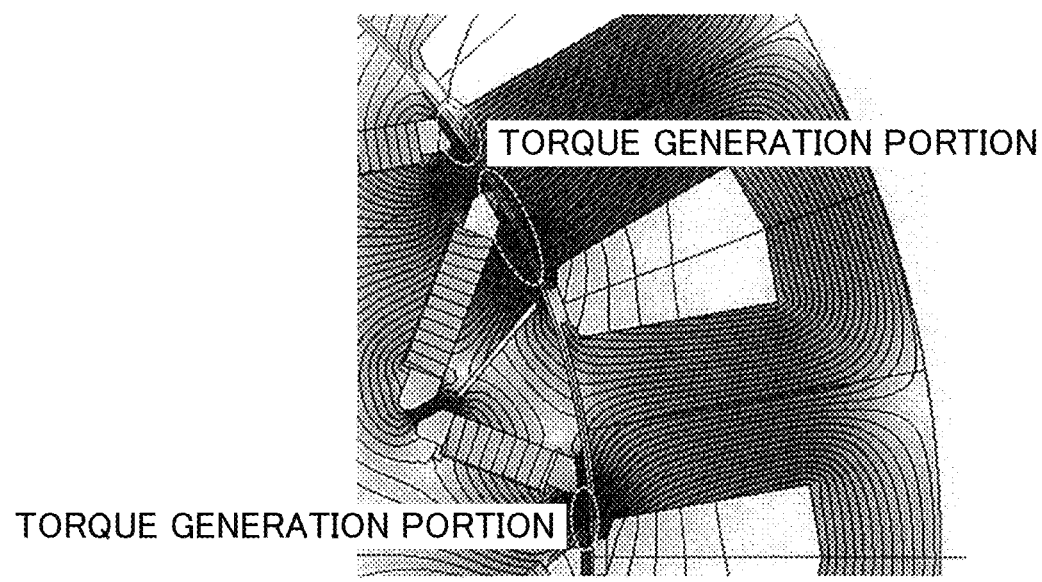
FIG. 10 is a diagram for illustrating magnetic flux density contours and flux lines obtained through magnetic field analysis at the time of the maximum power running torque in the rotating direction of the rotating electric machine having no cutout.
Figure 11:
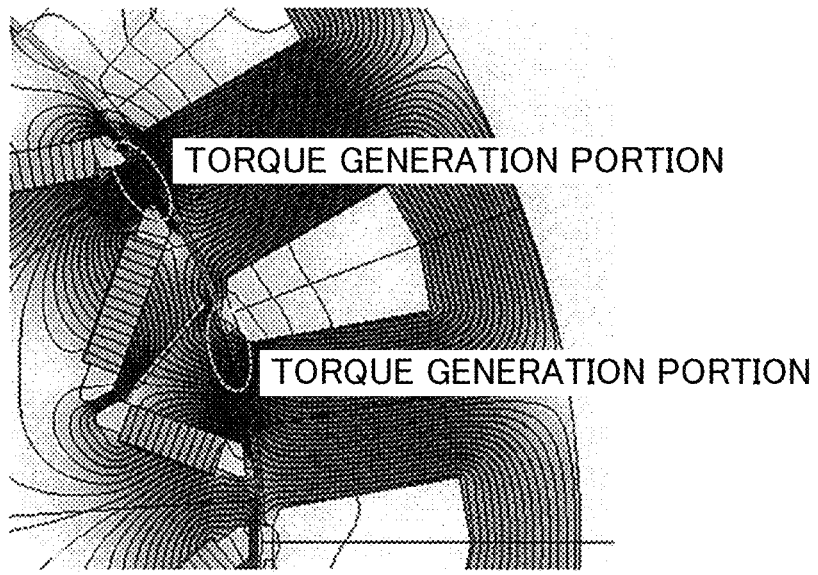
FIG. 11 is a diagram for illustrating magnetic flux density contours and flux lines obtained through magnetic field analysis at the time of the minimum power running torque in the counter-rotating direction of the rotating electric machine having no cutout.
Figure 12:
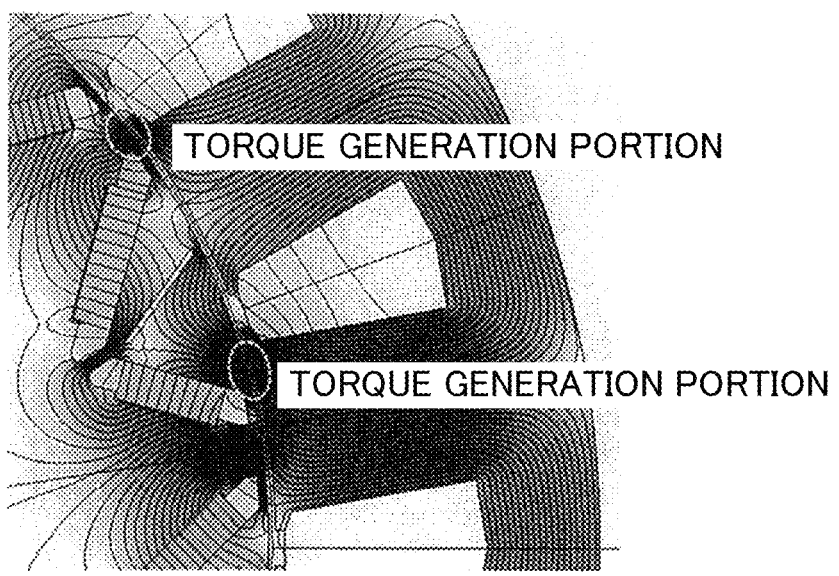
FIG. 12 is a diagram for illustrating magnetic flux density contours and flux lines obtained through magnetic field analysis at the time of the maximum power running torque in the counter-rotating direction of the rotating electric machine having no cutout.
Figure 13:
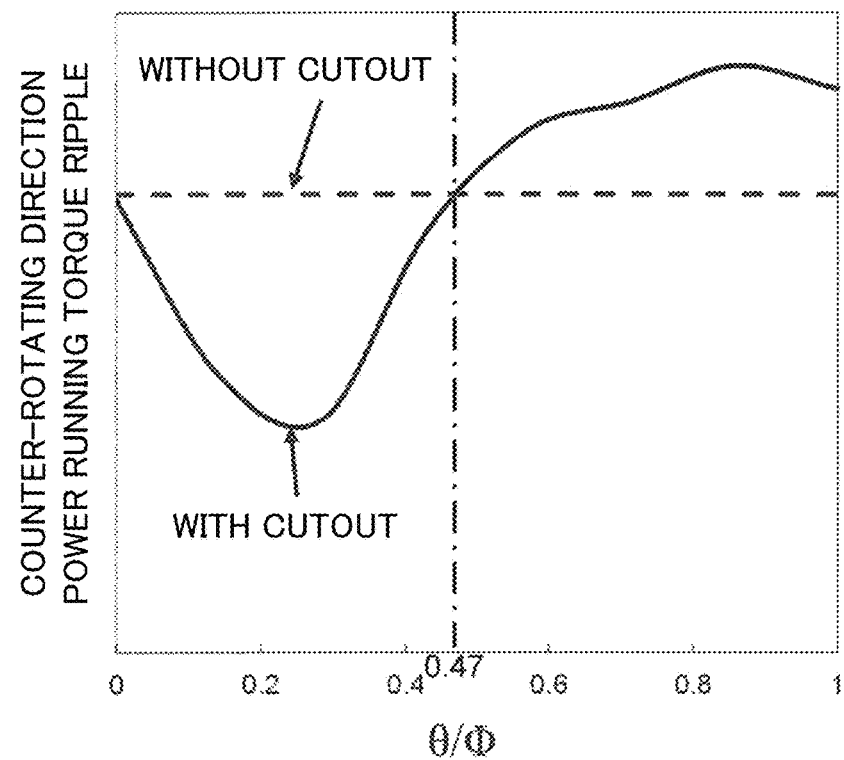
FIG. 13 is a graph for showing a magnetic field analysis result of the power running torque in the counter-rotating direction in the rotating electric machine according to the first embodiment of the present invention.

Next, effects obtained by forming the cutout 25 are described. FIG. 7 is a graph for showing a magnetic field analysis result of a power running torque in the rotating direction in the rotating electric machine according to the first embodiment of the present invention. FIG. 8 is a graph for showing a magnetic field analysis result of a power running torque in the counter-rotating direction in the rotating electric machine according to the first embodiment of the present invention. FIG. 9 to FIG. 12 are each a diagram for illustrating magnetic flux density contours and flux lines obtained through magnetic field analysis in the rotating electric machine having no cutout. FIG. 9 is an illustration of a state in which the power running torque in the rotating direction is minimum. FIG. 10 is an illustration of a state in which the power running torque in the rotating direction is maximum. FIG. 11 is an illustration of a state in which the power running torque in the counter-rotating direction is minimum. FIG. 12 is an illustration of a state in which the power running torque in the counter-rotating direction is maximum. FIG. 13 is a graph for showing a magnetic field analysis result of the power running torque in the counter-rotating direction in the rotating electric machine according to the first embodiment of the present invention. In FIG. 13, the horizontal axis represents θ/Φ, and the vertical axis represents the power running torque ripple in the counter-rotating direction.

It is understood from FIG. 7 that the power running torque in the rotating direction R has a small difference depending on the presence and absence of the cutout 25. It is understood from FIG. 8 that, in the power running torque in the counter-rotating direction, when the cutout 25 is formed, an amplitude of a 6f component having six peaks per period of electrical angle of a torque corresponding to the torque ripple is reduced.

It is understood from FIG. 9 to FIG. 12 that a rotation angle of the rotor 20 at which the power running torque in each of the rotating direction and the counter-rotating direction is minimum and a rotation angle of the rotor 20 at which the power running torque is maximum are different from each other. Further, it is understood that, at each rotation angle of the rotor 20, a torque generation portion varies in the core region on the radially outer side of the pair of permanent magnets 22 arranged in the V-shape.

In view of the above, the cutout 25 is formed in the torque generating portion at the rotation angle of the rotor 20 at which the power running torque in the counter-rotating direction is maximum, to thereby increase a magnetic resistance of the torque generating portion. Thus, the torque to be generated can be reduced. As a result, at the time of the power running operation, the power running torque ripple in the counter-rotating direction can be reduced. That is, at the time of the power running operation, the power running torque ripple in the opposite direction to the direction of the circumferential force acting on the rotor core 21 when the stator coil 12 is energized can be reduced.

It is understood from FIG. 13 that, when θ/Φ is larger than 0 and smaller than 0.47, the power running torque ripple in the counter-rotating direction is smaller than that in the case in which no cutout 25 is formed. That is, when the cutout 25 is formed in the gap surface 26 of the divided core region 30B so as to satisfy 0<θ/Φ<0.47, the power running torque ripple in the counter-rotating direction can be reduced.

Figure 14:
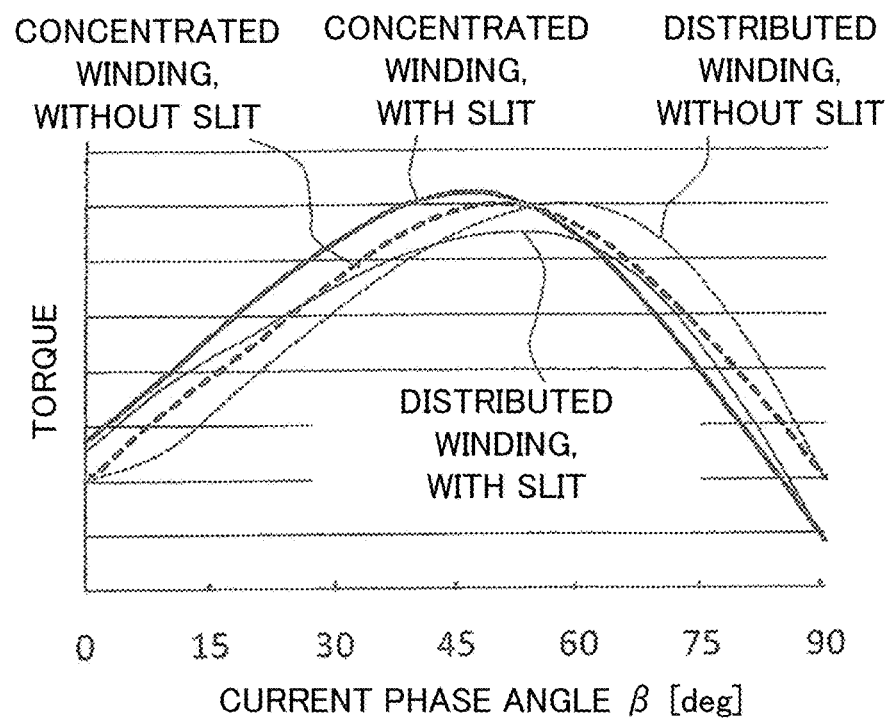
FIG. 14 is a graph for showing a change in torque with respect to the current phase angle under a condition of a constant current value, in the rotating electric machine according to the first embodiment of the present invention.

Next, results obtained by analyzing, by a finite element method, a change in torque with respect to the current phase angle β under a condition of a constant current value, in a configuration in which the permanent magnets 22 are removed from the rotor 20 and the stator coil 12 is formed of concentrated-winding coils or distributed-winding coils, are shown in FIG. 14. FIG. 14 is a graph for showing a change in torque with respect to a current phase angle under a condition of a constant current value, in the rotating electric machine according to the first embodiment of the present invention. In FIG. 14, the horizontal axis represents the current phase angle β, and the vertical axis represents torque. Further, the dotted line indicates the torque when no slit 29 is formed, and the solid line indicates the torque when the slit 29 is formed. The torque is the reluctance torque.

As shown in FIG. 14, when the stator coil having the concentrated-winding structure is used, in a case in which the slit 29 is formed, as compared to a case in which no slit 29 is formed, the positive peak value of the reluctance torque is increased. Meanwhile, when the stator coil having the distributed-winding structure is used, in the case in which the slit 29 is formed, as compared to the case in which no slit 29 is formed, the positive peak value of the reluctance torque is decreased. As described above, it has been confirmed that, even in the concentrated-winding structure in which exertion of the reluctance torque has been insufficient in the related art, when the slit 29 is formed, the path of the reluctance magnetic flux is changed, and thus the reluctance torque can be improved.

Further, as shown in FIG. 14, regardless of the winding structure of the stator coil, when the slit 29 is formed, the current phase angle β at which the reluctance torque has the positive peak value is decreased. Therefore, regardless of the winding structure of the stator coil, when the slit 29 is formed, the current phase angle β at which the magnet torque has the positive peak value and the current phase angle β at which the reluctance torque has the positive peak value are brought close to each other. As a result, at the time of the power running operation, the combined torque of the magnet torque and the reluctance torque is improved.

Figure 15:
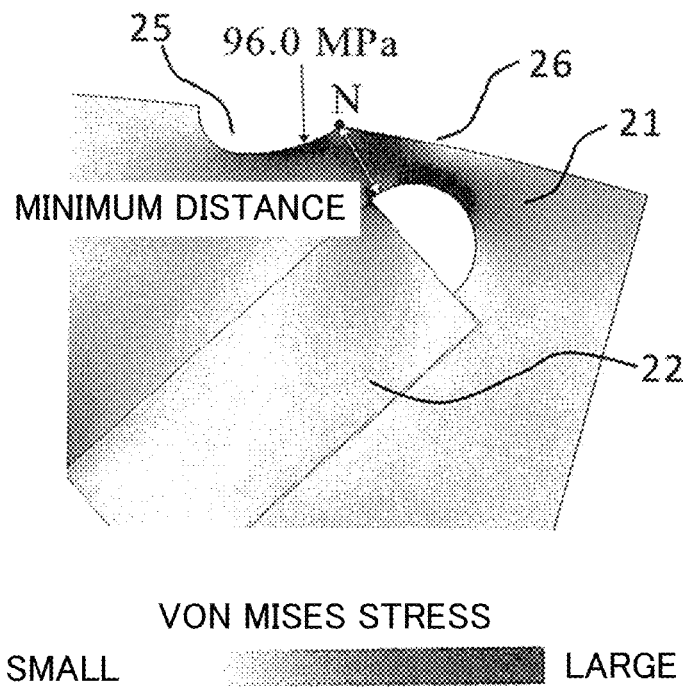
FIG. 15 is a von Mises stress distribution diagram of stress analysis in the rotating electric machine according to the first embodiment of the present invention.
Figure 16:
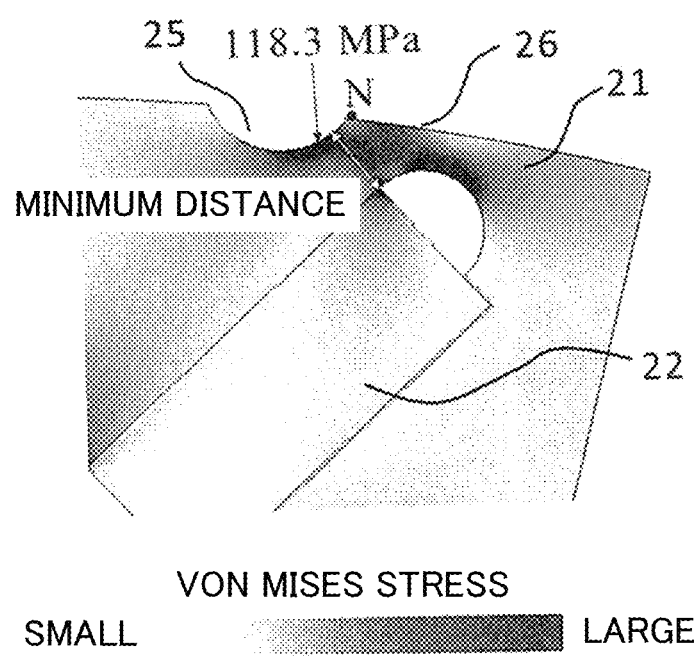
FIG. 16 is a von Mises stress distribution diagram of stress analysis in the rotating electric machine according to the first embodiment of the present invention.

Now, a positional relationship between the cutout 25 and the magnet insertion hole 23 is described. FIG. 15 and FIG. 16 are each a von Mises stress distribution diagram of stress analysis in the rotating electric machine according to the first embodiment of the present invention. FIG. 15 is an illustration of a case in which the minimum distance between the cutout 25 and the magnet insertion hole 23 includes the point N. FIG. 16 is an illustration of a case in which the minimum distance between the cutout 25 and the magnet insertion hole 23 does not include the point N.

With reference to FIG. 15, when the minimum distance between the cutout 25 and the magnet insertion hole 23 included the point N, the stress generated at a portion around the cutout 25 was 96.0 MPa. With reference to FIG. 16, when the minimum distance between the cutout 25 and the magnet insertion hole 23 did not include the point N, the stress generated at the portion around the cutout 25 was 118.3 MPa. As described above, it is understood that the stress in the case in which the minimum distance between the cutout 25 and the magnet insertion hole 23 includes the point N is smaller than the stress in the case in which the minimum distance between the cutout 25 and the magnet insertion hole 23 does not include the point N. When the cutout 25 is formed, the stress concentrates at the portion around the cutout 25. Therefore, when the distance between the cutout 25 and the magnet insertion hole 23 is decreased, the stress generated at the portion around the cutout 25 is increased. In the case in which the minimum distance between the cutout 25 and the magnet insertion hole 23 includes the point N, as compared to the case in which the minimum distance between the cutout 25 and the magnet insertion hole 23 does not include the point N, the distance between the cutout 25 and the magnet insertion hole 23 is larger, and thus the stress is smaller. Therefore, it is preferred that the cutout 25 be formed so that the minimum distance between the cutout 25 and the magnet insertion hole 23 includes the point N. In this case, the shortest position of the cutout 25 with respect to the magnet insertion holes 23 into which the permanent magnets 22 forming one magnetic pole are inserted is the intersection N of the cutout 25 with respect to the gap surface 26.

Figure 17:
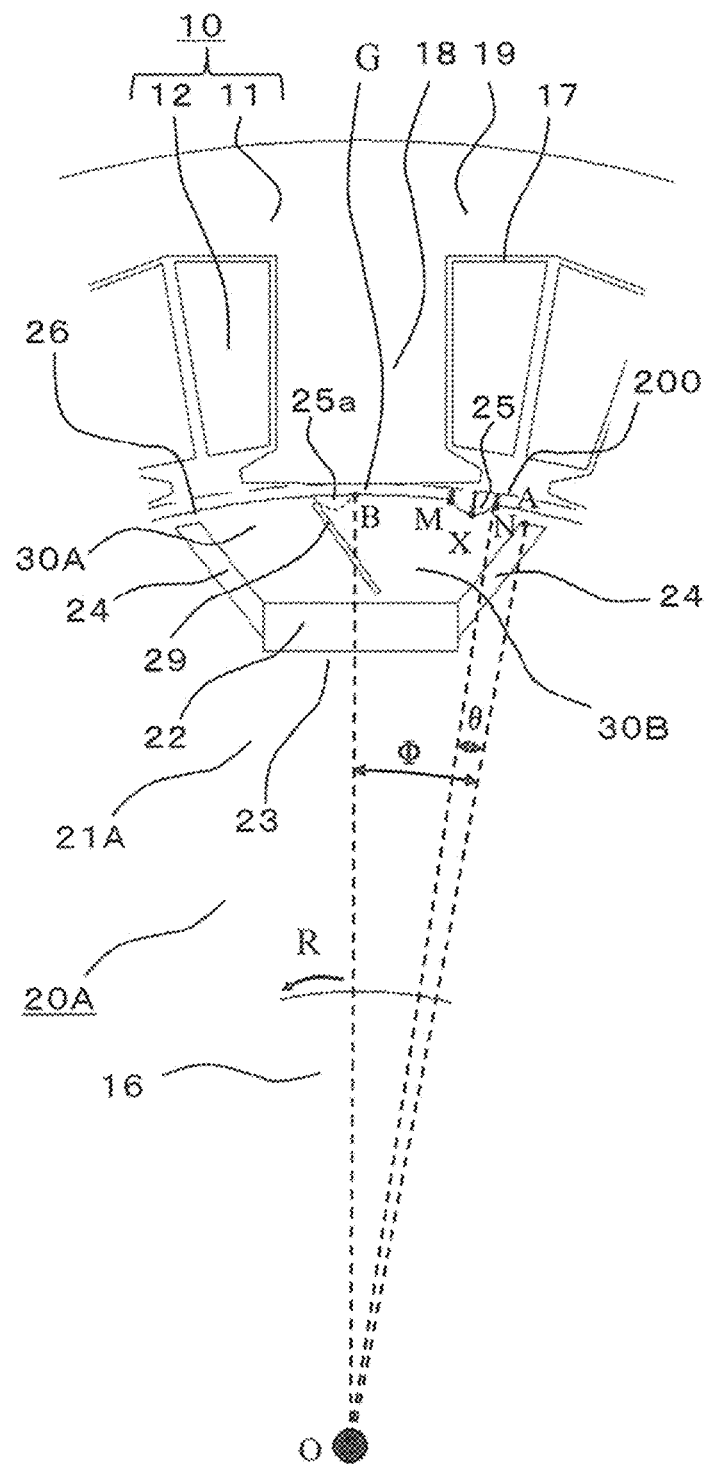
FIG. 17 is a main-part transverse sectional view for illustrating a first modification example in the rotating electric machine according to the first embodiment of the present invention.
Figure 18:
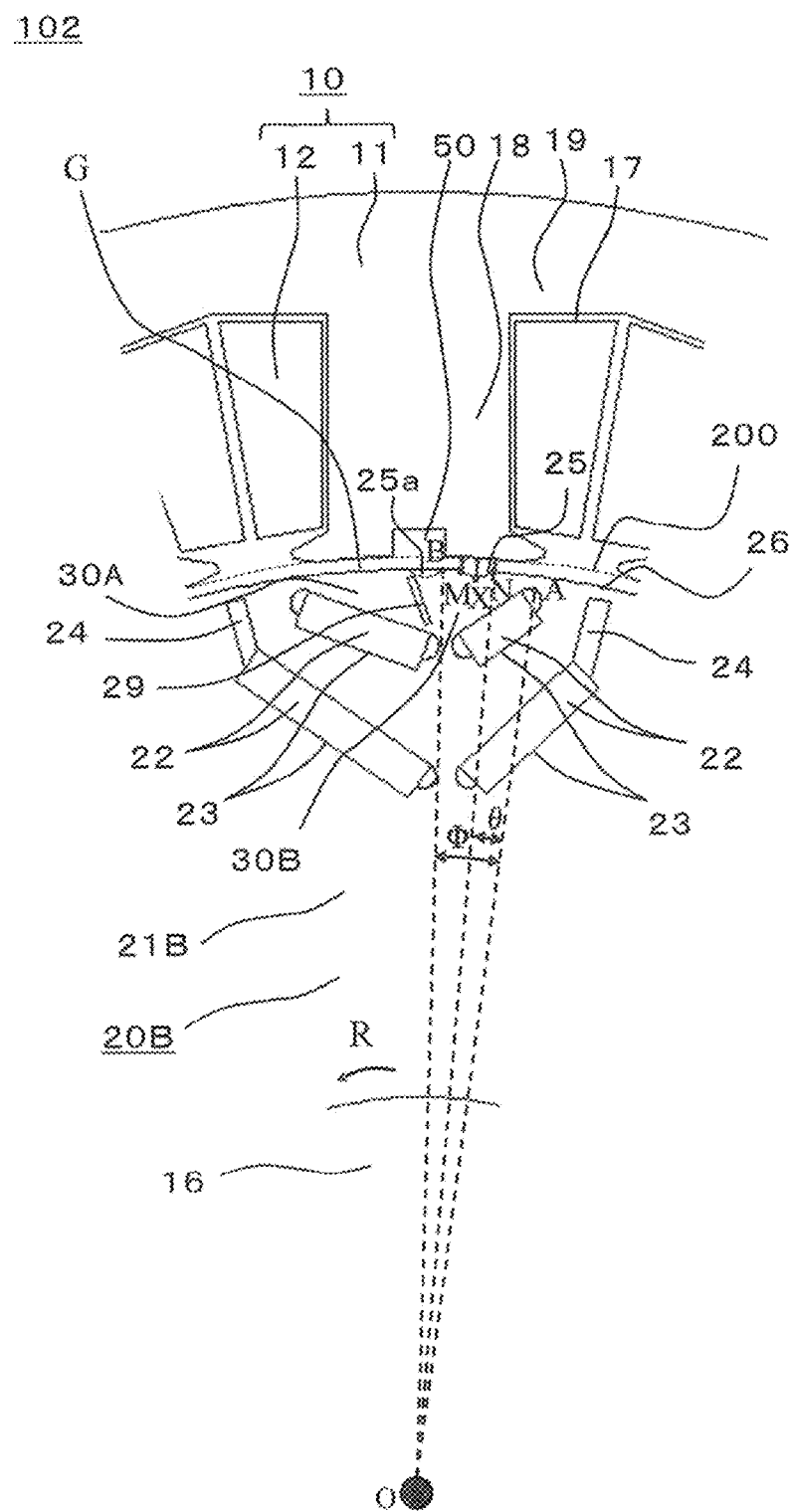
FIG. 18 is a main-part transverse sectional view for illustrating a second modification example in the rotating electric machine according to the first embodiment of the present invention.
Figure 19:
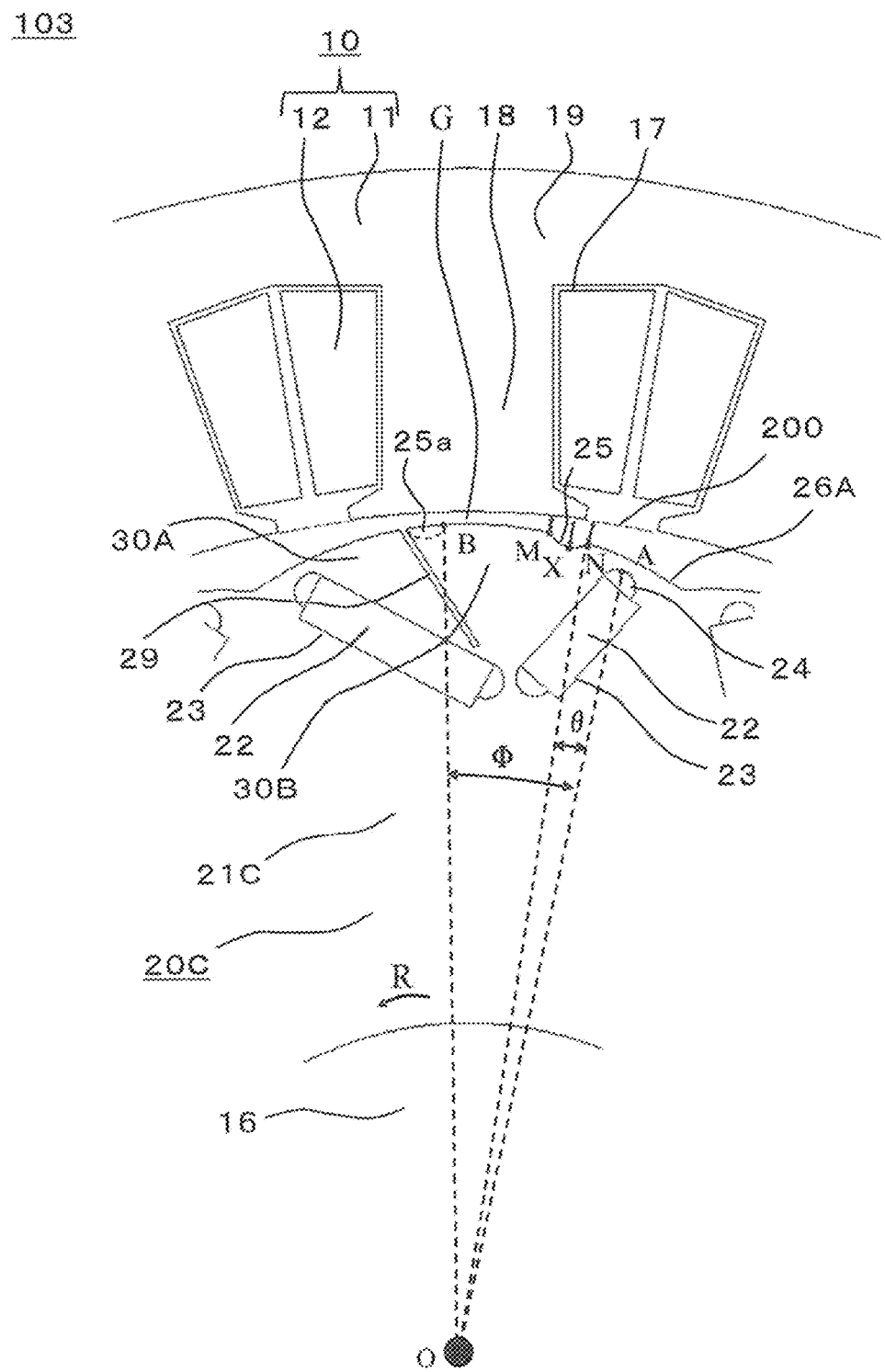
FIG. 19 is a main-part transverse sectional view for illustrating a third modification example in the rotating electric machine according to the first embodiment of the present invention.
Figure 20:
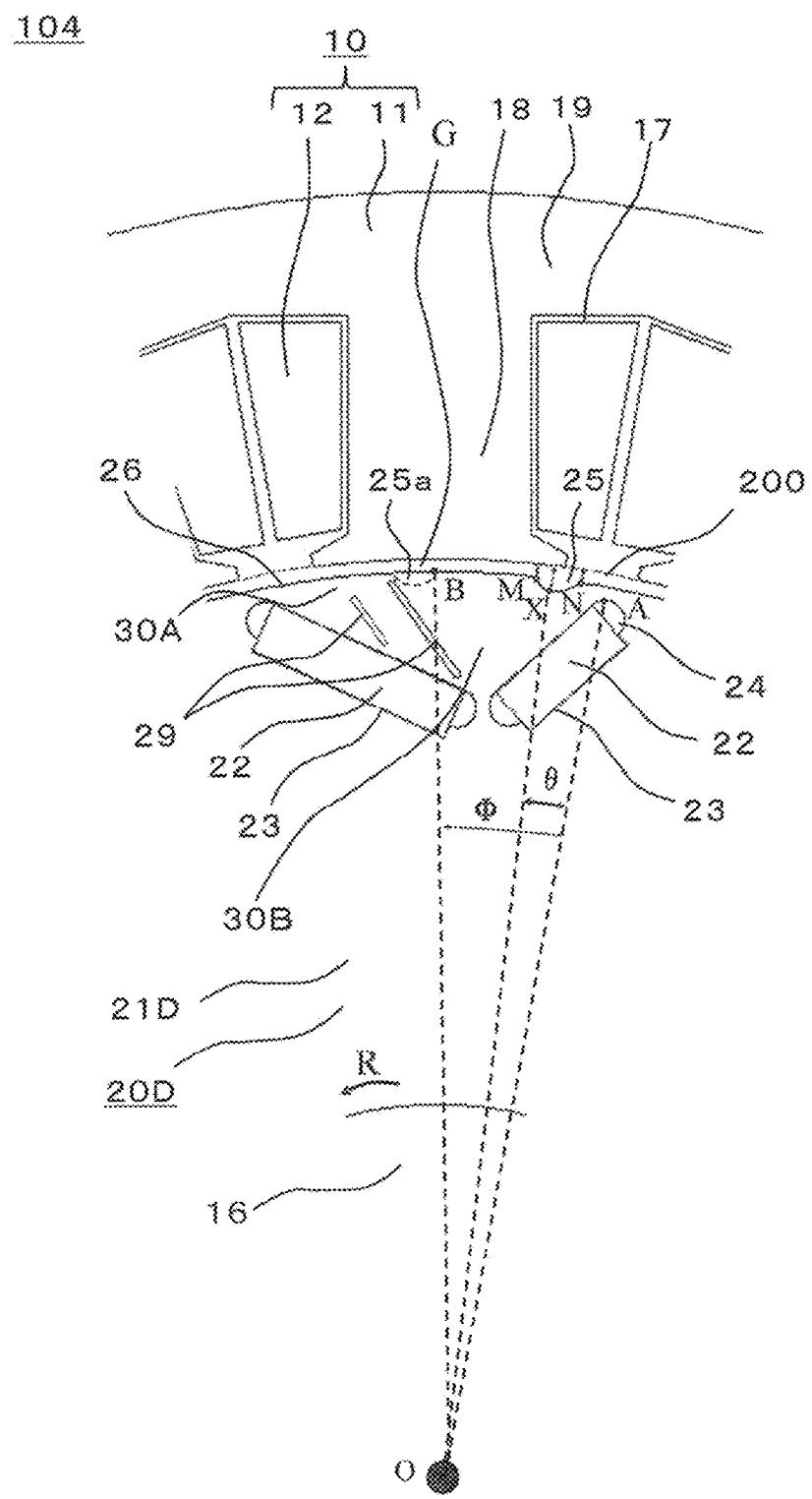
FIG. 20 is a main-part transverse sectional view for illustrating a fourth modification example in the rotating electric machine according to the first embodiment of the present invention.
Figure 21:
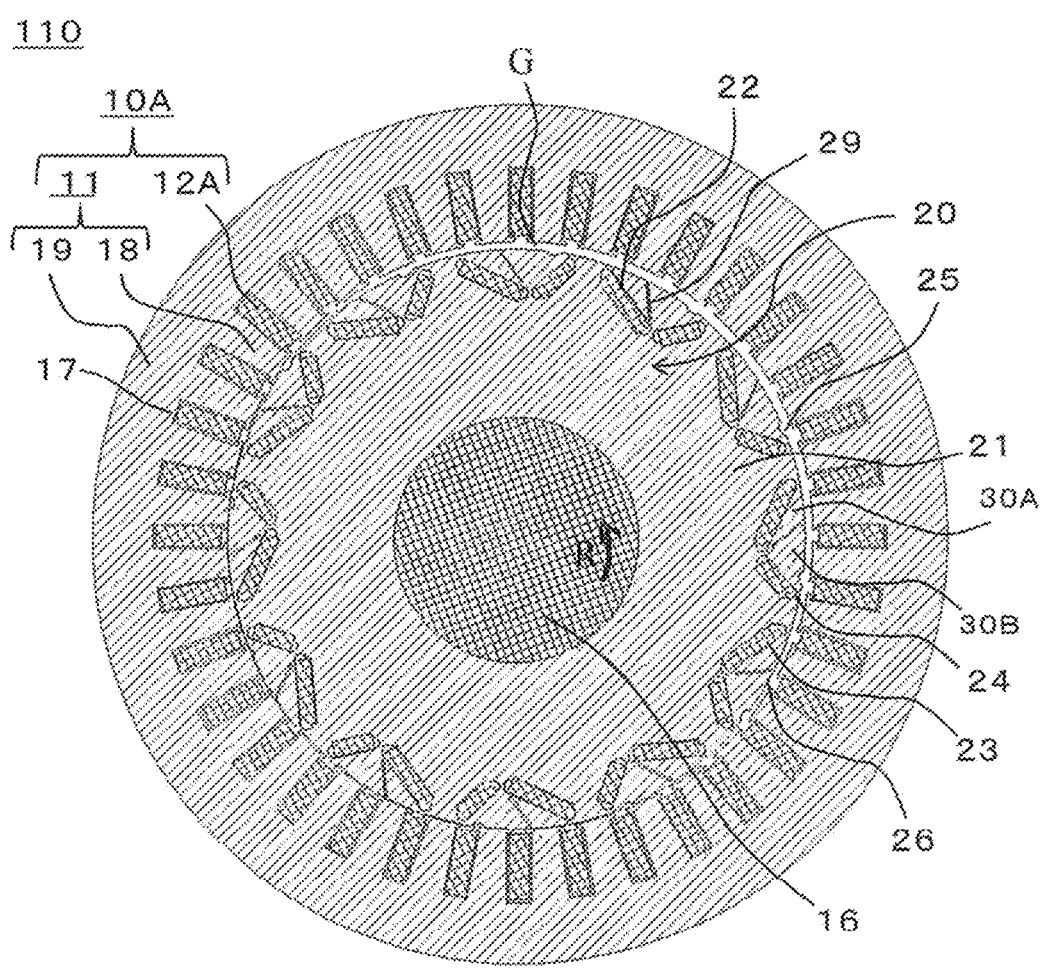
FIG. 21 is a transverse sectional view for illustrating a fifth modification example in the rotating electric machine according to the first embodiment of the present invention.

Next, modification examples of the rotating electric machine are described. FIG. 17 is a main-part transverse sectional view for illustrating a first modification example in the rotating electric machine according to the first embodiment of the present invention. FIG. 18 is a main-part transverse sectional view for illustrating a second modification example in the rotating electric machine according to the first embodiment of the present invention. FIG. 19 is a main-part transverse sectional view for illustrating a third modification example in the rotating electric machine according to the first embodiment of the present invention. FIG. 20 is a main-part transverse sectional view for illustrating a fourth modification example in the rotating electric machine according to the first embodiment of the present invention. FIG. 21 is a transverse sectional view for illustrating a fifth modification example in the rotating electric machine according to the first embodiment of the present invention.

A rotating electric machine 101 of the first modification example includes, as illustrated in FIG. 17, the stator 10 and a rotor 20A. In the stator 10, the distal end surfaces of the teeth 18 are formed as flat surfaces each orthogonal to the radial direction at its center position in the circumferential direction. In this manner, a radial distance of the gap G is minimum at the center position of the tooth 18 in the circumferential direction, and is changed depending on a circumferential position. In the rotor 20A, one magnet insertion hole 23 is formed per magnetic pole in a rotor core 21A so that the long side direction of the rectangular cross-section is orthogonal to the radial direction. One permanent magnet 22 inserted in the magnet insertion hole 23 forms one magnetic pole. Further, the flux barriers 24 are formed so as to extend to reach the vicinity of the gap surface 26 from both ends in the length direction of the long side of the rectangular cross-section of the magnet insertion hole 23. In this manner, the core region on the radially outer side of the permanent magnet 22 forming one magnetic pole is defined. Other configurations are similar to those in the above-mentioned first embodiment. Also in the rotating electric machine 101 of the first modification example, effects similar to those in the rotating electric machine 100 of the above-mentioned first embodiment can be obtained.

A rotating electric machine 102 of the second modification example includes, as illustrated in FIG. 18, the stator 10 and a rotor 20B. In the stator 10, recessed portions 50 are formed in the distal end surfaces of the teeth 18 at its center position in the circumferential direction. In this manner, a radial distance of the gap G is changed depending on the circumferential position of the tooth 18. In the rotor 20B, two pairs of magnet insertion holes 23 each arranged in the V-shape are formed per magnetic pole in a rotor core 21B so as to be arrayed in two layers in the radial direction. Four permanent magnets 22 inserted in the four magnet insertion holes 23 form one magnetic pole. The slit 29 is formed in the core region on the radially outer side of the pair of permanent magnets 22 arranged in the V-shape on the radially outer side. Other configurations are similar to those in the above-mentioned first embodiment. Also in the rotating electric machine 102 of the second modification example, effects similar to those in the rotating electric machine 100 of the above-mentioned first embodiment can be obtained.

A rotating electric machine 103 of the third modification example includes, as illustrated in FIG. 19, the stator 10 and a rotor 20C. In a rotor core 21C of the rotor 20C, a gap surface 26A is formed by connecting twelve arc surfaces having the same curvature radius in the circumferential direction. Each arc surface forms a radially outer surface of the core region on the radially outer side of the pair of permanent magnets 22 forming one magnetic pole and being arranged in the V-shape. In this manner, the radial distance of the gap G is changed depending on the circumferential position of the tooth 18. The slit 29 is formed so as to be opened to the gap G in the core region on the radially outer side of the pair of permanent magnets 22 forming one magnetic pole and being arranged in the V-shape. Other configurations are similar to those in the above-mentioned first embodiment. Also in the rotating electric machine 103 of the third modification example, effects similar to those in the rotating electric machine 100 of the above-mentioned first embodiment can be obtained.

A rotating electric machine 104 of the fourth modification example includes, as illustrated in FIG. 20, the stator 10 and a rotor 20D. In a rotor core 21D of the rotor 20D, two slits 29 are formed in the core region on the radially outer side of the pair of permanent magnets 22 forming one magnetic pole and being arranged in the V-shape. The two slits 29 tilt to the front side in the rotating direction R, and are separated from each other in the circumferential direction. In this manner, the core region on the radially outer side of the pair of permanent magnets 22 forming one magnetic pole is divided into three divided core regions in the circumferential direction. That is, the core region on the radially outer side of the pair of permanent magnets 22 forming one magnetic pole is divided into two divided core regions 30A positioned on the front side in the rotating direction R, and one divided core region 30B positioned on the rear side in the rotating direction R. The cutout 25 is formed in the gap surface 26 of the divided core region 30B positioned at the head in the direction opposite to the rotating direction R. Other configurations are similar to those in the above-mentioned first embodiment. Also in the rotating electric machine 104 of the fourth modification example, effects similar to those in the rotating electric machine 100 of the above-mentioned first embodiment can be obtained.

A rotating electric machine 110 of the fifth modification example includes, as illustrated in FIG. 21, a stator 10A and the rotor 20. In the stator 10A, a stator coil 12A is formed of a distributed winding coil. Other configurations are similar to those in the above-mentioned first embodiment. Also in the rotating electric machine 110 of the fifth modification example, effects similar to those in the rotating electric machine 100 of the above-mentioned first embodiment can be obtained.

Accordingly, as described in the first modification example to the fifth modification example, as long as the cutout 25 is positioned in the divided core region 30B on the opposite side in the direction of the circumferential force acting on the rotor 20 when the stator coil 12 is energized, in the core region on the radially outer side of the permanent magnet 22 forming one magnetic pole, effects similar to those in the first embodiment can be obtained even when the shape, the number, and the arrangement of slits 29, the number of permanent magnets 22, and the winding form of the stator coil 12 are changed as appropriate.

Further, each of the slit 29 and the cutout 25 is only required to have a magnetic permeability lower than that of the rotor core 21. In view of the above, a reduced magnetic permeability region in which the magnetic characteristic is deteriorated by residual stress may be used instead of using the slit 29 or the cutout 25.

Second Embodiment

Figure 22:
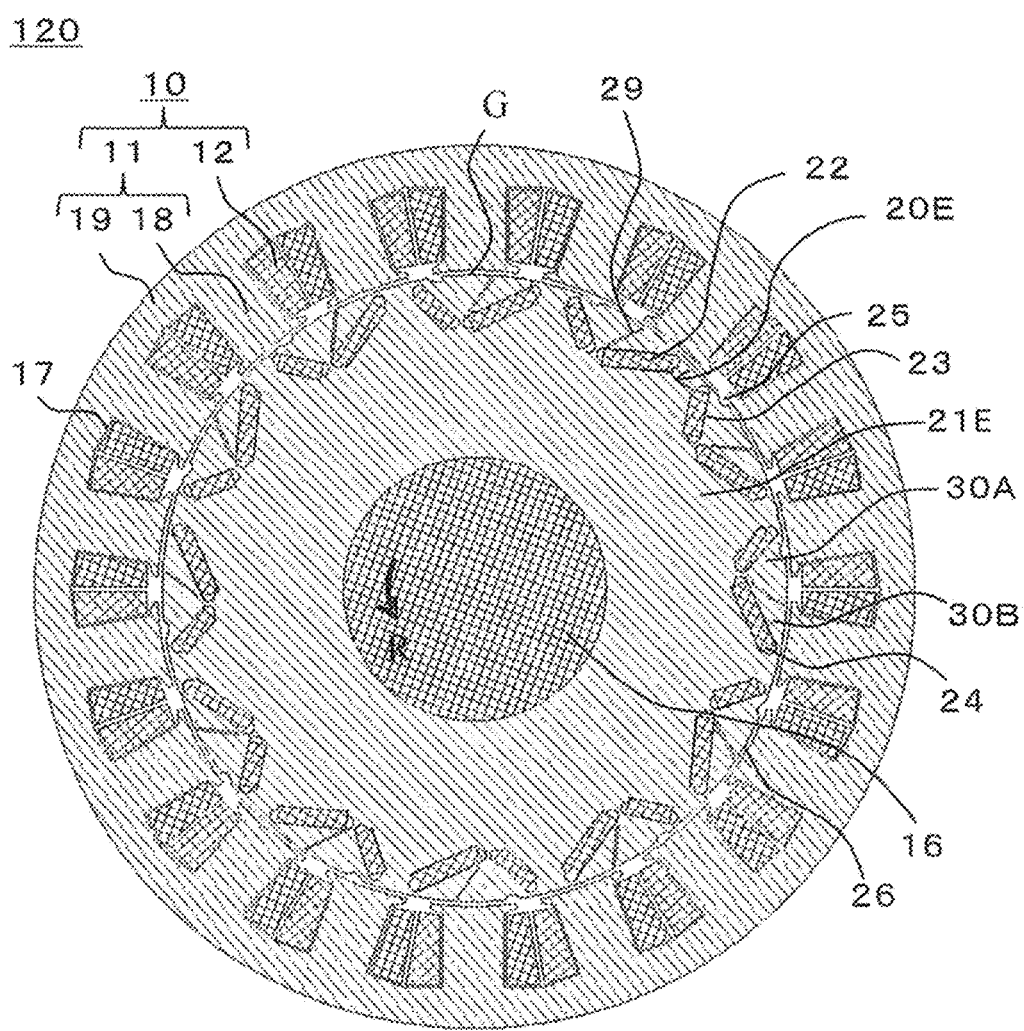
FIG. 22 is a transverse sectional view for illustrating a rotating electric machine according to a second embodiment of the present invention.
Figure 23:
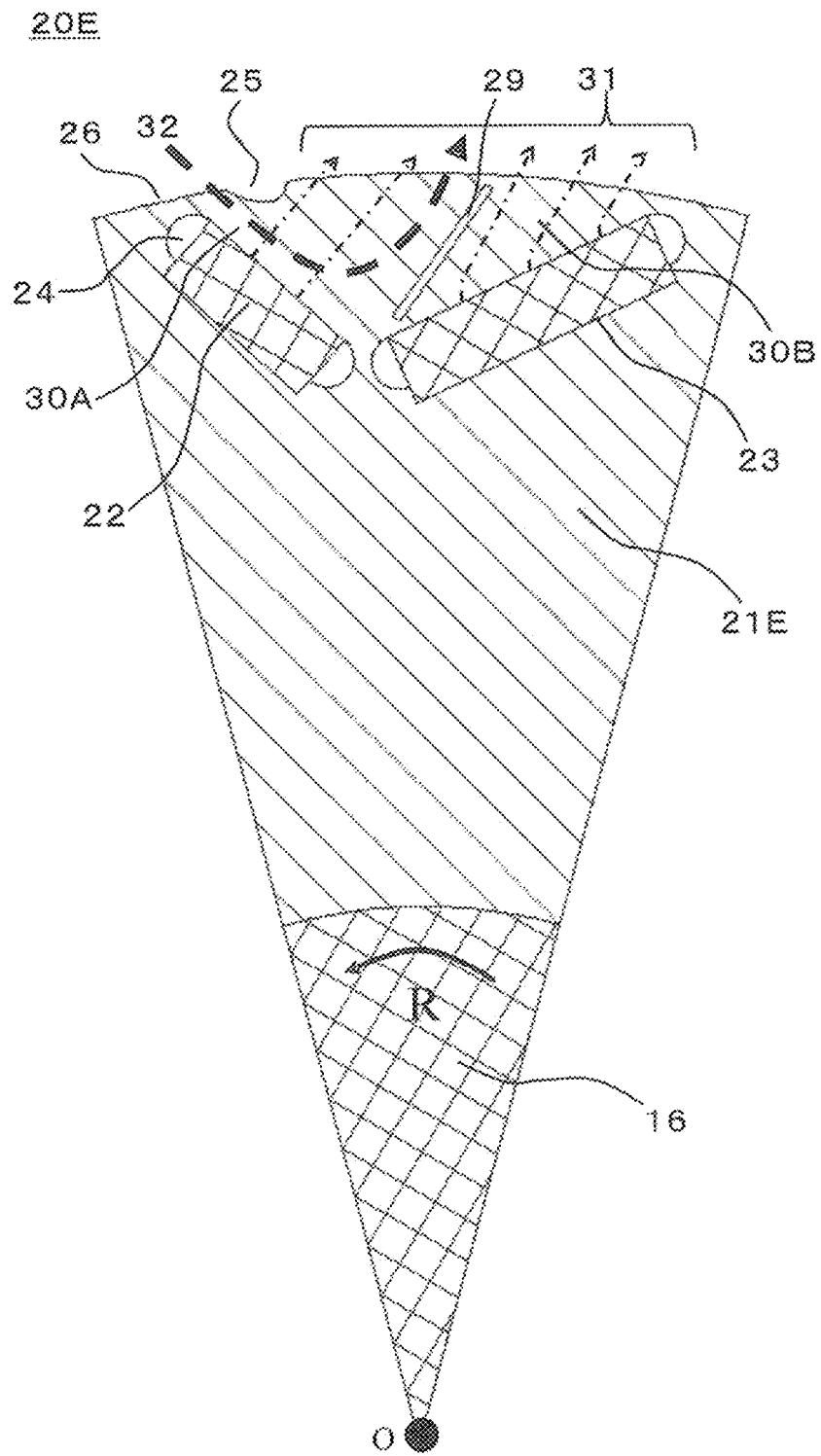
FIG. 23 is a main-part transverse sectional view for illustrating a part around one magnetic pole of a rotor in the rotating electric machine according to the second embodiment of the present invention.

FIG. 22 is a transverse sectional view for illustrating a rotating electric machine according to a second embodiment of the present invention. FIG. 23 is a main-part transverse sectional view for illustrating a part around one magnetic pole of a rotor in the rotating electric machine according to the second embodiment of the present invention.

The rotating electric machine 100 according to the above-mentioned first embodiment is assumed to be used for the power running operation, but a rotating electric machine 120 according to the second embodiment is assumed to be used for a regeneration operation. The regeneration operation refers to an operation for converting kinetic energy given to a rotor 20E into electrical energy to extract the electrical energy from a terminal of the stator coil 12. At this time, the rotating electric machine 120 acts as a power generator. The regeneration operation is not a main idea of the present invention, and thus detailed description thereof is herein omitted.

In FIG. 22 and FIG. 23, the rotating electric machine 120 includes the stator 10 and the rotor 20E. The rotor 20E is arranged on the radially inner side of the stator 10 and coaxially with the stator 10 with the gap G being secured between the rotor 20E and the stator 10. The rotor 20E includes a rotor core 21E. Although not shown, the stator 10 and the rotor 20E are accommodated in a housing formed of the frame 13 and the pair of end plates 15.

The rotor core 21E is configured similarly to the rotor core 21 except that the arrangement of the slit 29 and the cutout 25 is different. Specifically, the slit 29 extends in a linear band shape in a core region on the radially outer side of the pair of permanent magnets 22 forming one magnetic pole and being arranged in the V-shape to reach the vicinity of the gap surface 26 of the rotor core 21E. The slit 29 tilts to the rear side, that is, the backward side in the rotating direction R.

The core region on the radially outer side of the pair of permanent magnets 22 forming one magnetic pole and being arranged in the V-shape is divided by the slit 29 into the divided core region 30A on the forward side in the rotating direction R and the divided core region 30B on the backward side in the rotating direction R.

At the time of the regeneration operation, the circumferential force acting on the rotor 20E when the stator coil 12 is energized is generated in the divided core region 30B. The cutout 25 is formed in a part of the gap surface 26 of the divided core region 30A in the divided core regions 30A and 30B. The divided core region 30A is on the opposite side in the direction of the circumferential force acting on the rotor 20E when the stator coil 12 is energized. Further, the cutout 25 is formed in the gap surface 26 of the divided core region 30A so as to satisfy $0<\theta/\Phi<0.47$.

The rotor 20E rotates by receiving kinetic energy from the outside. At the time of the regeneration operation, the direction of the circumferential force acting on the rotor 20E when the stator coil 12 is energized is reverse to the rotating direction R of the rotor 20E. That is, at the time of the regeneration operation, the torque that the rotating electric machine 120 itself exerts acts so as to cancel out the torque from the outside.

Next, a state of the magnetic fluxes being sources of generation of the torque is described. At the time of the regeneration operation, the magnet magnetic flux 31 generated from the permanent magnet 22 positioned on the backward side in the rotating direction R is likely to flow from the rotor core 21E to the gap G. At this time, a direction in which the magnet magnetic flux 31 flows is restricted by the slit 29 being the low magnetic permeability region, and the magnet magnetic flux 31 is caused to deviate to the backward side in the rotating direction R. In this manner, the magnet magnetic flux 31 is localized in the divided core region 30B on the backward side in the rotating direction R as indicated by the arrows of FIG. 23. As a result, a current phase angle β at which a magnet torque has a negative peak value can be set smaller than a current phase angle β of a case in which no slit 29 is formed. As a result, a current phase angle β at which a reluctance torque has a negative peak value can be set larger than the current phase angle obtained in the case in which no slit 29 is formed.

Further, a path of the reluctance magnetic flux 32, which is likely to flow from the stator core 11 to the rotor core 21E via the gap G, is restricted by the slit 29 being the low magnetic permeability region. In this manner, the reluctance magnetic flux 32 passes through the divided core region 30A on the forward side in the rotating direction R without passing through the divided core region 30B on the backward side in the rotating direction R as indicated by the arrow of FIG. 23. In this manner, the current phase angle β at which the reluctance torque has the negative peak value can be set larger than the current phase angle β obtained in the case in which no slit 29 is formed.

In the second embodiment, the slit 29 is formed so that the current phase angle at which the magnet torque has the negative peak value and the current phase angle at which the reluctance torque has the negative peak value can be brought close to each other. Therefore, the combined torque of the magnet torque and the reluctance torque of the rotating electric machine 120 at the time of the regeneration operation can be improved.

Further, the cutout 25 is formed in a part of the gap surface 26 of the divided core region 30A on the opposite side in the direction of the circumferential force acting on the rotor 20E when the stator coil 12 is energized. Further, the cutout 25 is formed in the gap surface 26 of the divided core region 30A so as to satisfy $0<\theta/\Phi<0.47$. Therefore, at the time of the regeneration operation, the torque ripple in the rotating direction R can be reduced. That is, at the time of the regeneration operation, the torque ripple in the opposite direction to the direction of the circumferential force acting on the rotor 20E when the stator coil 12 is energized can be reduced.

Also in the second embodiment, similarly to the above-mentioned first embodiment, as long as the cutout 25 is positioned in the core region on the opposite side in the direction of the circumferential force acting on the rotor 20E when the stator coil 12 is energized, in the core region obtained by dividing, by the slit 29, the core region on the radially outer side of the permanent magnets 22 forming one magnetic pole, the shape, the number, and the arrangement of slits 29, and the number of permanent magnets 22 can be changed as appropriate.

Third Embodiment

Figure 24:
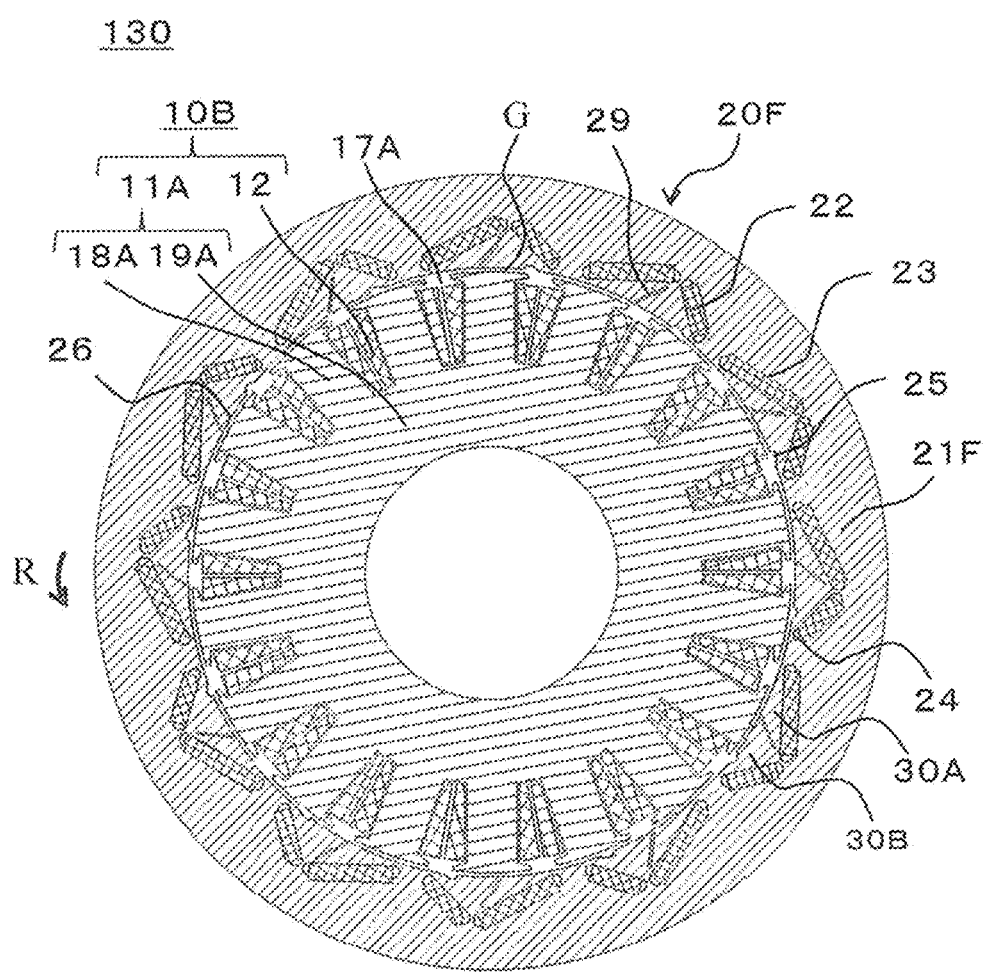
FIG. 24 is a transverse sectional view for illustrating a rotating electric machine according to a third embodiment of the present invention.

FIG. 24 is a transverse sectional view for illustrating a rotating electric machine according to a third embodiment of the present invention.

In FIG. 24, a rotating electric machine 130 includes a stator 10B and a rotor 20F. The rotor 20F is arranged on the radially outer side of the stator 10B and coaxially with the stator 10B with a gap G being secured between the stator 10B and the rotor 20F.

The stator 10B includes an annular stator core 11A, and the stator coil 12 mounted to the stator core 11A. The stator core 11A includes an annular core back 19A, and a plurality of teeth 18A projecting from an outer peripheral surface of the core back 19A outward in the radial direction. Eighteen teeth 18A are arrayed at equiangular pitches in the circumferential direction, and a region between adjacent teeth 18A serves as a slot 17A. The stator coil 12 is formed of concentrated-winding coils each formed by winding a conductive wire around corresponding one of the teeth 18A.

The rotor 20F includes a rotor core 21F, and twenty-four permanent magnets 22 embedded on the radially inner side of the rotor core 21F. Twelve pairs of magnet insertion holes 23 passing through the rotor core 21F in the axial direction are formed at equiangular pitches on the radially inner side of the rotor core 21F. Each pair of magnet insertion holes 23 is formed in a V-shape so that an interval in the circumferential direction is gradually increased toward the radially inner side. The magnet insertion holes 23 are each formed into a hole shape having a rectangular cross-section. End portions on the radially outer side of the magnet insertion holes 23 forming a pair are separated away from each other in the circumferential direction.

The permanent magnets 22 are each formed as a prismatic body having a rectangular cross-section equivalent to that of the magnet insertion hole 23. The permanent magnets 22 are each magnetized so as to have magnetization orthogonal to a surface defined by a long side of the rectangular cross-section. In this manner, a first surface of the permanent magnet 22 defined by the long side of the rectangular cross-section thereof has an N pole, and a second surface thereof on the opposite side of the first surface has an S pole. The permanent magnets 22 are inserted and held in each pair of magnet insertion holes 23 so that surfaces having the same polarity are directed to the radially inner side, and are inserted and held in adjacent pairs of magnet insertion holes 23 so that surfaces having different polarities are directed to the radially inner side. That is, each pair of permanent magnets 22 arranged in a V-shape in which an interval in the circumferential direction is gradually increased toward the gap G side forms one magnetic pole. Then, twelve pairs of permanent magnets 22 each forming one magnetic pole are embedded on the radially outer side of the rotor core 21 to be arrayed at equiangular pitches in the circumferential direction. In this manner, the rotor 20F has twelve magnetic poles.

The flux barrier 24 is formed by projecting a surface on the radially inner side of each magnet insertion hole 23, which is defined by a short side of the rectangular cross-section thereof, in a length direction of the long side of the rectangular cross-section of the magnet insertion hole 23. The flux barrier 24 is formed by projecting a surface on the radially outer side of each magnet insertion hole 23, which is defined by a short side of the rectangular cross-section thereof, in the length direction of the long side of the rectangular cross-section of the magnet insertion hole 23. Each of the flux barriers 24 is formed to pass through the rotor core 21F in the axial direction.

The slit 29 is formed in the core region of the rotor core 21F positioned on the radially inner side, that is, on the gap G side of the pair of permanent magnets 22 forming one magnetic pole and being arranged in the V-shape. The slit 29 extends in a linear band shape so as to reach the vicinity of the gap surface 26 corresponding to an inner peripheral surface of the rotor core 21F. The slit 29 tilts forward in the rotating direction R.

The core region on the radially outer side of the pair of permanent magnets 22 forming one magnetic pole and being arranged in the V-shape is divided by the slit 29 into two regions of the divided core region 30A on the forward side in the rotating direction R and the divided core region 30B on the backward side in the rotating direction R. At the time of the power running operation, the circumferential force acting on the rotor 20F when the stator coil 12 is energized is generated in the divided core region 30A. At the time of the power running operation, when the stator coil 12 is energized, the circumferential force acts on the rotor 20F in the same direction as the rotating direction R of the rotor 20.

The cutout 25 is formed in the divided core region 30B on the rear side in the rotating direction R with respect to the slit 29, in the divided core regions 30A and 30B on the radially outer side of the pair of permanent magnets 22 forming one magnetic pole and being arranged in the V-shape. Still further, the cutout 25 is formed in the gap surface 26 of the divided core region 30B so as to satisfy $0<\theta/\Phi<0.47$.

In the rotating electric machine 130 configured as described above, the number of the slots 17A of the stator 10B is eighteen, and the number of poles of the rotor 20F is twelve. That is, the rotating electric machine 130 is an outer rotor-type rotating electric machine employing a system in which a ratio of the number of poles to the number of slots is 2:3. The rotating electric machine 130 is assumed to be used for a power running operation.

In the third embodiment, the slit 29 is formed in the core region on the radially inner side of the pair of permanent magnets 22 arranged in the V-shape so as to tilt to the forward side in the rotating direction R. Therefore, the combined torque of the magnet torque and the reluctance torque of the rotating electric machine 130 at the time of the power running operation can be improved.

Further, the cutout 25 is formed in a part of the gap surface 26 of the divided core region 30B on the opposite side in the direction of the circumferential force acting on the rotor 20F when the stator coil 12 is energized. Further, the cutout 25 is formed in the gap surface 26 of the divided core region 30B so as to satisfy 0<θ/Φ<0.47. Therefore, at the time of the power running operation, the power running torque ripple in the opposite direction to the direction of the circumferential force acting on the rotor 20F when the stator coil 12 is energized can be reduced.

The third embodiment is applied to the rotating electric machine to be used for the power running operation, in which the slit tilts to the forward side in the rotating direction, but the sixth embodiment may be applied to the rotating electric machine to be used for the regeneration operation, in which the slit tilts to the backward side in the rotating direction.

In the above-mentioned embodiments, each of the stator core and the rotor core is formed of stacked cores obtained by stacking electromagnetic steel plates, but each of the stator core and the rotor core may be formed of a block core formed of a block magnetic body.

Further, in the above-mentioned embodiments, the description has been given of the rotating electric machine employing a system of twelve poles and eighteen slots, that is, a system of 2:3. However, the ratio of the number of poles to the number of slots in the rotating electric machine is not limited to 2:3, and may be, for example, 8:9 or 10:12. The system of 8:9 or 10:12 has an effect of increasing the winding factor as compared to the system of 2:3, and can improve the torque and suppress a torque pulsation.

REFERENCE SIGNS LIST 10, 10A, 10B stator, 11, 11A stator core, 12, 12A stator coil, 18, 18A teeth, 19, 19A core back, 20, 20A, 20B, 20C, 20D, 20E, 20F rotor, 21, 21A, 21B, 21C, 21D, 21E, 21F rotor core, 22 permanent magnet, 23 magnet insertion hole, 24 flux barrier, 25 cutout, 25a imaginary cutout, 26, 26A gap surface, 29 slit, 30A, 30B divided core region, 200 stator core imaginary gap surface, G gap

The invention claimed is:

1. A rotating electric machine, comprising:
a stator including:
a stator core in which a plurality of teeth radially projecting from an annular core back are arrayed in a circumferential direction; and
a stator coil; and
a rotor including:
a rotor core arranged coaxially with the stator core with a gap being secured between the stator core and the rotor core; and
a plurality of permanent magnets which are embedded in the rotor core, and are arranged in the circumferential direction,
wherein the rotor core has:
a gap surface facing the gap;
a plurality of magnet insertion holes into which the plurality of permanent magnets are inserted;
a slit which is formed in a core region between the gap surface and, among the plurality of magnet insertion holes, a magnet insertion hole into which a permanent magnet forming one magnetic pole is inserted, and divides the core region into a plurality of divided core regions in the circumferential direction; and
a cutout formed by denting the gap surface of, among the plurality of divided core regions, a divided core region positioned at a head in a direction opposite to a direction of a circumferential force acting on the rotor when the stator coil is energized,
wherein, in a plane orthogonal to an axial direction of the rotor core, a shortest distance between a stator core imaginary gap surface which is a perfect circle having an axial center of the rotor core as a center, and is in contact with distal end surfaces of the plurality of teeth facing the gap, and a bottom point of the cutout is longer than a shortest distance between the stator core imaginary gap surface and each of two intersections between the cutout and the gap surface,
wherein a minimum distance between the cutout and the magnet insertion hole in a region of the rotor core into which a reluctance magnetic flux flows from the stator core is longer than a minimum distance between the magnet insertion hole and the gap surface,
wherein, when a point closest to the gap surface of a magnet insertion hole positioned at a head in the direction opposite to the direction of the circumferential force acting on the rotor when the stator coil is energized, in the magnet insertion hole into which the permanent magnet forming one magnetic pole is inserted, is represented by a point A,
an intersection closer to the point A of the two intersections between the cutout and the gap surface is represented by a point N,
an intersection closer to the point A of two intersections between the gap surface and an imaginary cutout obtained by imaginarily moving the cutout in the circumferential direction until the cutout is in contact with the slit is represented by a point B,
a rotation center of the rotor core is represented by a point O,
an angle between a straight line OA connecting between the point A and the point O and a straight line ON connecting between the point N and the point O is represented by θ, and
an angle between the straight line OA connecting between the point A and the point O and a straight line OB connecting between the point B and the point O is represented by Φ,
θ/Φ satisfies 0<θ/Φ<0.47.

2. The rotating electric machine according to claim 1, wherein the cutout is filled with air.

3. The rotating electric machine according to claim 1, wherein the slit is filled with air.

4. The rotating electric machine according to claim 1, wherein the slit tilts in the direction of the circumferential force acting on the rotor when the stator coil is energized.

5. The rotating electric machine according to claim 1, wherein the one magnetic pole is formed by two permanent magnets.

6. The rotating electric machine according to claim 5, wherein the two permanent magnets are arranged in a V-shape in which a circumferential interval is gradually increased toward the gap surface.

7. The rotating electric machine according to claim 1, wherein the stator coil is formed of a concentrated-winding coil.

8. The rotating electric machine according to claim 1, wherein a ratio of the number of poles of the rotor to the number of slots of the stator is 2:3.

9. A rotating electric machine, comprising:
a stator including:
a stator core in which a plurality of teeth radially projecting from an annular core back are arrayed in a circumferential direction; and
a stator coil; and a rotor including:
  a rotor core arranged coaxially with the stator core with a gap being secured between the stator core and the rotor core; and
  a plurality of permanent magnets which are embedded in the rotor core, and are arranged in the circumferential direction,
wherein the rotor core has:
  a gap surface facing the gap;
  a plurality of magnet insertion holes into which the plurality of permanent magnets are inserted;
  a slit which is formed in a core region between the gap surface and, among the plurality of magnet insertion holes, a magnet insertion hole into which a permanent magnet forming one magnetic pole is inserted, and divides the core region into a plurality of divided core regions in the circumferential direction; and
  a cutout formed by denting the gap surface of, among the plurality of divided core regions, a divided core region positioned at a head in a direction opposite to a direction of a circumferential force acting on the rotor when the stator coil is energized,
wherein, in a plane orthogonal to an axial direction of the rotor core, a shortest distance between a stator core imaginary gap surface which is a perfect circle having an axial center of the rotor core as a center, and is in contact with distal end surfaces of the plurality of teeth facing the gap, and a bottom point of the cutout is longer than a shortest distance between the stator core imaginary gap surface and each of two intersections between the cutout and the gap surface,
wherein a shortest position of the cutout with respect to the magnet insertion hole into which the permanent magnet forming one magnetic pole is inserted in a region of the rotor core into which a reluctance magnetic flux flows from the stator core is an intersection between the cutout and the gap surface, and
  wherein a bottom point of the cutout is closer to, of the two intersections between the cutout and the gap surface, an intersection which is different from the intersection between the cutout and the gap surface at the shortest position of the cutout with respect to the magnet insertion hole, and is positioned in the direction of the circumferential force acting on the rotor when the stator coil is energized.

10. The rotating electric machine according to claim 9, wherein, when a point closest to the gap surface of a magnet insertion hole positioned at a head in the direction opposite to the direction of the circumferential force acting on the rotor when the stator coil is energized, in the magnet insertion hole into which the permanent magnet forming one magnetic pole is inserted, is represented by a point A,
  an intersection closer to the point A of the two intersections between the cutout and the gap surface is represented by a point N,
  an intersection closer to the point A of two intersections between the gap surface and an imaginary cutout obtained by imaginarily moving the cutout in the circumferential direction until the cutout is in contact with the slit is represented by a point B,
  a rotation center of the rotor core is represented by a point O,
  an angle between a straight line OA connecting between the point A and the point O and a straight line ON connecting between the point N and the point O is represented by $\theta$, and
  an angle between the straight line OA connecting between the point A and the point O and a straight line OB connecting between the point B and the point O is represented by $\Phi$,
  $\theta/\Phi$ satisfies $0<\theta/\Phi<0.47$.

11. The rotating electric machine according to claim 9, wherein the cutout is filled with air.

12. The rotating electric machine according to claim 9, wherein the slit is filled with air.

13. The rotating electric machine according to claim 9, wherein the slit tilts in the direction of the circumferential force acting on the rotor when the stator coil is energized.

14. The rotating electric machine according to claim 9, wherein the one magnetic pole is formed by two permanent magnets.

15. The rotating electric machine according to claim 14, wherein the two permanent magnets are arranged in a V-shape in which a circumferential interval is gradually increased toward the gap surface.

16. The rotating electric machine according to claim 9, wherein the stator coil is formed of a concentrated-winding coil.

17. The rotating electric machine according to claim 9, wherein a ratio of the number of poles of the rotor to the number of slots of the stator is 2:3.

* * * * *